United States Patent
van Os

(10) Patent No.: US 9,542,038 B2
(45) Date of Patent: Jan. 10, 2017

(54) PERSONALIZING COLORS OF USER INTERFACES

(75) Inventor: Marcel van Os, San Francisco, CA (US)

(73) Assignee: Apple Inc., Cupertino, CA (US)

(*) Notice: Subject to any disclaimer, the term of this patent is extended or adjusted under 35 U.S.C. 154(b) by 537 days.

(21) Appl. No.: 13/081,334

(22) Filed: Apr. 6, 2011

(65) Prior Publication Data

US 2011/0252344 A1    Oct. 13, 2011

Related U.S. Application Data

(60) Provisional application No. 61/321,716, filed on Apr. 7, 2010.

(51) Int. Cl.

| | |
|---|---|
| *G06F 3/041* | (2006.01) |
| *A63F 13/63* | (2014.01) |
| *G06Q 30/06* | (2012.01) |
| *G06F 9/44* | (2006.01) |
| *H04M 1/725* | (2006.01) |

(52) U.S. Cl.
CPC .............. *G06F 3/0418* (2013.01); *A63F 13/63* (2014.09); *G06F 9/4443* (2013.01); *G06Q 30/0621* (2013.01); *A63F 2300/5553* (2013.01); *A63F 2300/6018* (2013.01); *H04M 1/72544* (2013.01)

(58) Field of Classification Search
USPC ........................................................ 715/763
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,615,320 A | 3/1997 | Lavendel |
| 5,825,352 A | 10/1998 | Bisset et al. |

(Continued)

FOREIGN PATENT DOCUMENTS

| | | |
|---|---|---|
| EP | 1429291 A1 | 6/2004 |
| JP | 2000-163031 | 6/2000 |

(Continued)

OTHER PUBLICATIONS

The Mii Avatar Editor available at http://www.miisearch.com/mii-creator.html as of Jan. 7, 2010 (Mii Editor).*

(Continued)

*Primary Examiner* — William Bashore
*Assistant Examiner* — Nathan Shrewsbury

(57) ABSTRACT

Methods, systems, and computer-readable media for creating customized color schemes for user interfaces are disclosed. An avatar editing environment associated with a user is provided and user input specifying colors for the avatar is received. A color profile of the avatar can be created based on the colors associated with the avatar. Customized color schemes associated with a software application can be created based on the color profile of the user's avatar. An application selection interface can present a respective user interface element for each application available for selection. The application selection interface and user interface element for each available application can be rendered in a respective color scheme selected based on the color profile of the user's avatar and one or more characteristic colors extracted from an icon of the application.

31 Claims, 15 Drawing Sheets

(56) References Cited

U.S. PATENT DOCUMENTS

| | | | |
|---|---|---|---|
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,453,294 B1 | 9/2002 | Dutta et al. | |
| 6,545,682 B1 | 4/2003 | Ventrella et al. | |
| 6,690,376 B1* | 2/2004 | Saito et al. | 345/473 |
| 6,690,387 B2 | 2/2004 | Zimmerman et al. | |
| 6,873,610 B1 | 3/2005 | Noever | |
| 7,015,894 B2 | 3/2006 | Morohoshi | |
| 7,184,064 B2 | 2/2007 | Zimmerman et al. | |
| 7,386,799 B1 | 6/2008 | Clanton et al. | |
| 7,484,176 B2 | 1/2009 | Blattner et al. | |
| 7,487,458 B2 | 2/2009 | Jalon et al. | |
| 7,603,413 B1 | 10/2009 | Herold et al. | |
| 7,636,755 B2 | 12/2009 | Blattner et al. | |
| 7,663,607 B2 | 2/2010 | Hotelling et al. | |
| 7,697,960 B2 | 4/2010 | Seo et al. | |
| 7,761,339 B2* | 7/2010 | Alivandi | 705/26.5 |
| 7,827,495 B2* | 11/2010 | Bells et al. | 715/744 |
| 7,895,049 B2 | 2/2011 | O'Sullivan et al. | |
| 7,908,554 B1 | 3/2011 | Blattner | |
| 7,921,066 B2 | 4/2011 | Van Dyke Parunak et al. | |
| 7,979,574 B2 | 7/2011 | Gillo et al. | |
| 8,026,918 B1 | 9/2011 | Murphy | |
| 8,037,147 B1 | 10/2011 | Herold et al. | |
| 8,047,988 B2 | 11/2011 | Lee et al. | |
| 8,088,044 B2 | 1/2012 | Tchao et al. | |
| 8,156,060 B2 | 4/2012 | Borzestowski et al. | |
| 8,250,144 B2 | 8/2012 | Blattner et al. | |
| 8,384,719 B2 | 2/2013 | Reville et al. | |
| RE44,054 E* | 3/2013 | Kim | 715/706 |
| 8,402,378 B2 | 3/2013 | Blattner et al. | |
| 8,439,750 B2* | 5/2013 | Kawamoto | 463/30 |
| 8,473,848 B2* | 6/2013 | Bells et al. | 715/744 |
| 8,479,122 B2 | 7/2013 | Hotelling et al. | |
| 8,692,830 B2 | 4/2014 | Nelson et al. | |
| 8,694,899 B2 | 4/2014 | Goossens et al. | |
| 2001/0050689 A1 | 12/2001 | Park | |
| 2002/0061781 A1* | 5/2002 | Tonomura | 463/43 |
| 2003/0110450 A1 | 6/2003 | Sakai | |
| 2005/0026685 A1* | 2/2005 | Ruark et al. | 463/31 |
| 2005/0078804 A1 | 4/2005 | Yomoda | |
| 2005/0143108 A1 | 6/2005 | Seo et al. | |
| 2005/0248574 A1 | 11/2005 | Ashtekar et al. | |
| 2006/0026521 A1 | 2/2006 | Hotelling et al. | |
| 2006/0059430 A1* | 3/2006 | Bells et al. | 715/747 |
| 2006/0075053 A1* | 4/2006 | Xu | H04L 12/581 709/206 |
| 2006/0197753 A1 | 9/2006 | Hotelling | |
| 2006/0294465 A1 | 12/2006 | Ronen et al. | |
| 2007/0130001 A1 | 6/2007 | Jung et al. | |
| 2007/0162936 A1 | 7/2007 | Stallings et al. | |
| 2007/0171091 A1 | 7/2007 | Nisenboim et al. | |
| 2007/0260984 A1 | 11/2007 | Marks et al. | |
| 2007/0277109 A1* | 11/2007 | Chen et al. | 715/733 |
| 2008/0163074 A1 | 7/2008 | Tu | |
| 2009/0015593 A1* | 1/2009 | Kang et al. | 345/581 |
| 2009/0049392 A1* | 2/2009 | Karttunen et al. | 715/762 |
| 2009/0144639 A1 | 6/2009 | Nims et al. | |
| 2009/0147008 A1 | 6/2009 | Do et al. | |
| 2009/0150778 A1 | 6/2009 | Nicol, II | |
| 2009/0175521 A1 | 7/2009 | Shadan et al. | |
| 2009/0237328 A1 | 9/2009 | Gyorfi et al. | |
| 2009/0254859 A1* | 10/2009 | Arrasvuori et al. | 715/810 |
| 2009/0281925 A1* | 11/2009 | Winter et al. | 705/27 |
| 2009/0300513 A1 | 12/2009 | Nims et al. | |
| 2010/0211899 A1* | 8/2010 | Fujioka | 715/765 |
| 2010/0302395 A1 | 12/2010 | Mathe et al. | |
| 2011/0161837 A1* | 6/2011 | Betzler et al. | 715/757 |
| 2011/0248992 A1 | 10/2011 | van Os et al. | |
| 2011/0292051 A1 | 12/2011 | Nelson et al. | |
| 2011/0296324 A1 | 12/2011 | Goossens et al. | |

FOREIGN PATENT DOCUMENTS

| | | |
|---|---|---|
| JP | 2002-342033 | 11/2002 |
| KR | 1020020042248 A | 6/2002 |
| WO | 2007/120981 A2 | 10/2007 |
| WO | 2009/133710 | 11/2009 |

OTHER PUBLICATIONS

Free Photoshop Tutorials: Gradient Filter II at http://www.digiretus.com/tippek/cikkiro.php?SORSZAM=177 as of Mar. 28, 2009 (Photoshop).*

Anticipated by <http://www.myavatareditor.com> verified available as of Feb. 27, 2009 by Archive.org (MyAvatar).*

Amin, Alia K., et al., "The Sense MS: Enriching the SMS experience for Teens by Non-verbal Means", *Human-Computer Interaction—INTERACT 2005*, IFIP TC13 International Conference Proceedings, Rome, Italy, Sep. 12-16, 2005, pp. 962-965.

PCT Notification of Transmittal of the International Search Report and the Written Opinion for Application No. PCT/US2011/031616 dated Aug. 30, 2011, 9 pages.

Maria del Puy Carretero et al., "Preserving Avator Genuineness in Different Display Media," Mobile Networks and Applications, vol. 13, No. 6, Jul. 15, 2008, pp. 627-634.

U.S. Non-Final Office Action for U.S. Appl. No. 12/791,643 dated Jan. 20, 2012, 12 pages.

International Preliminary Report on Patentability issued in PCT/US2011/031616 on Oct. 9, 2012, 6 pages.

Office Action in Taiwan Application No. 100111887 issued on Oct. 7, 2013, 23 pages with English translation.

"Model Generation for an Intrusion Detection System Using Genetic Algorithms" Chittur, Adhitya, Nov. 27, 2001.

Lee, S.K. et al. (Apr. 1985). "A Multi-Touch Three Dimensional Touch-Sensitive Tablet," Proceedings of CHI: ACM Conference on Human Factors in Computing Systems, DD. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

700

> Presenting an application selection interface in an operating environment associated with a user, the application selection interface presenting a respective user interface element for each application available for selection, and the application selection interface being rendered in a color scheme selected based on the color profile of the user's avatar
> _702_

> Deriving one or more characteristic colors from a respective program icon of each available application _712_

> Rendering the user interface element for each available application according to a color scheme based on the characteristic colors derived from the program's icon and the color profile of the user's avatar _714_

FIG. 7B

PERSONALIZING COLORS OF USER INTERFACES

CROSS-REFERENCE TO RELATED APPLICATIONS

This application claims the benefit of U.S. Provisional Application Ser. No. 61/321,716, filed on Apr. 7, 2010, under 35 U.S.C. §119(e). The disclosure of the prior application is considered part of and is incorporated by reference in the disclosure of this application.

TECHNICAL FIELD

This disclosure relates generally to color scheme creation for computer systems and other devices.

BACKGROUND

A software application executing in a virtual operating environment, such as an operating system of a computing device, typically employs graphical user interfaces for presenting information and receiving user input. User interface elements, such as text, buttons, menus, windows, icons, titles, backgrounds, sliders, and so on, can be rendered with various colors, styles, and various animation and sound effects.

The developers of a software application can provide software instructions in the application program for a customization environment that allows user customization of some aspects of the user interfaces in the application environment. When the software application is executed in an operating environment, a user can invoke the application specific customization environment through one or more user interfaces of the executing application program (e.g., by selecting a menu item for customization in the application program interfaces). The user can then specify colors, styles, and various animation and sound effects for the user interfaces of the application through the application specific customization environment. Once the customization is completed, the user interface elements of the software application can be rendered according to the user's specifications.

SUMMARY

A method for creating color schemes for user interfaces is disclosed. The method creates customized color schemes for use in online games and other applications. A user can create an avatar with features associated with physical characteristics of humans and fashion, and specify the colors associated with various elements of the avatar, such as the skin, hair, eyes, clothing, accessory, and background colors of the avatar. These colors can be used to create a color profile for the user's avatar, and used to influence the color appearance of user interface elements in online games and other application environments, particularly where the user's avatar may appear.

In some implementations, the color customization of online games and other applications based on the avatar's color profile can take into account the characteristic colors of the specific games and/or applications that are being rendered on a user's device. The characteristic colors of a game and/or application can be extracted or determined from graphic art (e.g., an application icon) included in the game or application software. The characteristic colors of the game or application software can be used in combination with the color profile of the avatar to create visually pleasing and customized color schemes for the game or application environment.

In some implementations, avatar data including its associated color profile can be stored on a remote server so that the color profile can be used in online applications or downloaded to a variety of user devices at different user locations. In some implementations, the color scheme customization can be accomplished by a remote server providing the online applications or downloadable programs. In some implementations, the color scheme customization can be performed locally on each client device as the application environment is being rendered on the device.

In some implementations, a computer-implemented method includes: obtaining a color profile of an avatar associated with a user, the avatar being a figurative representation of the user within an operating environment associated with the user, and the color profile specifying one or more colors associated with one or more constituent elements of the avatar; and customizing a color scheme associated with a software application based on the color profile of the user's avatar.

In some implementations, a computer-implemented method includes: presenting an application selection interface in the operating environment associated with the user, the application selection interface presenting a respective user interface element for each application available for selection, and the application selection interface being rendered in a first color scheme selected based on the color profile of the user's avatar.

In some implementations, the method further includes: deriving one or more characteristic colors from a respective program icon of each available application; and rendering the user interface element for each available application according to a color scheme based on the characteristic colors derived from the available application's program icon. In some implementations, the user interface element for each available application is rendered according to a color scheme based on the characteristic colors derived from the program's icon and the color profile of the user's avatar.

Some embodiments include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, and other types of invocations or parameters via the API.

The details of one or more implementations of color customization methods, systems, and computer-readable media are set forth in the accompanying drawings and the description below. Other features, aspects, and advantages of the color customization methods and systems will become apparent from the description, the drawings, and the claims.

BRIEF DESCRIPTION OF THE DRAWINGS

FIG. 7A. is a flow diagram of an exemplary process for customizing an application selection interface based on the color profile of a user's avatar.

FIG. 7B is a flow diagram of an exemplary process for customizing an application selection interface based on both the color profile of a user's avatar and individual application's characteristic colors.

Like reference symbols in the various drawings indicate like elements.

DETAILED DESCRIPTION

Figure 1A:
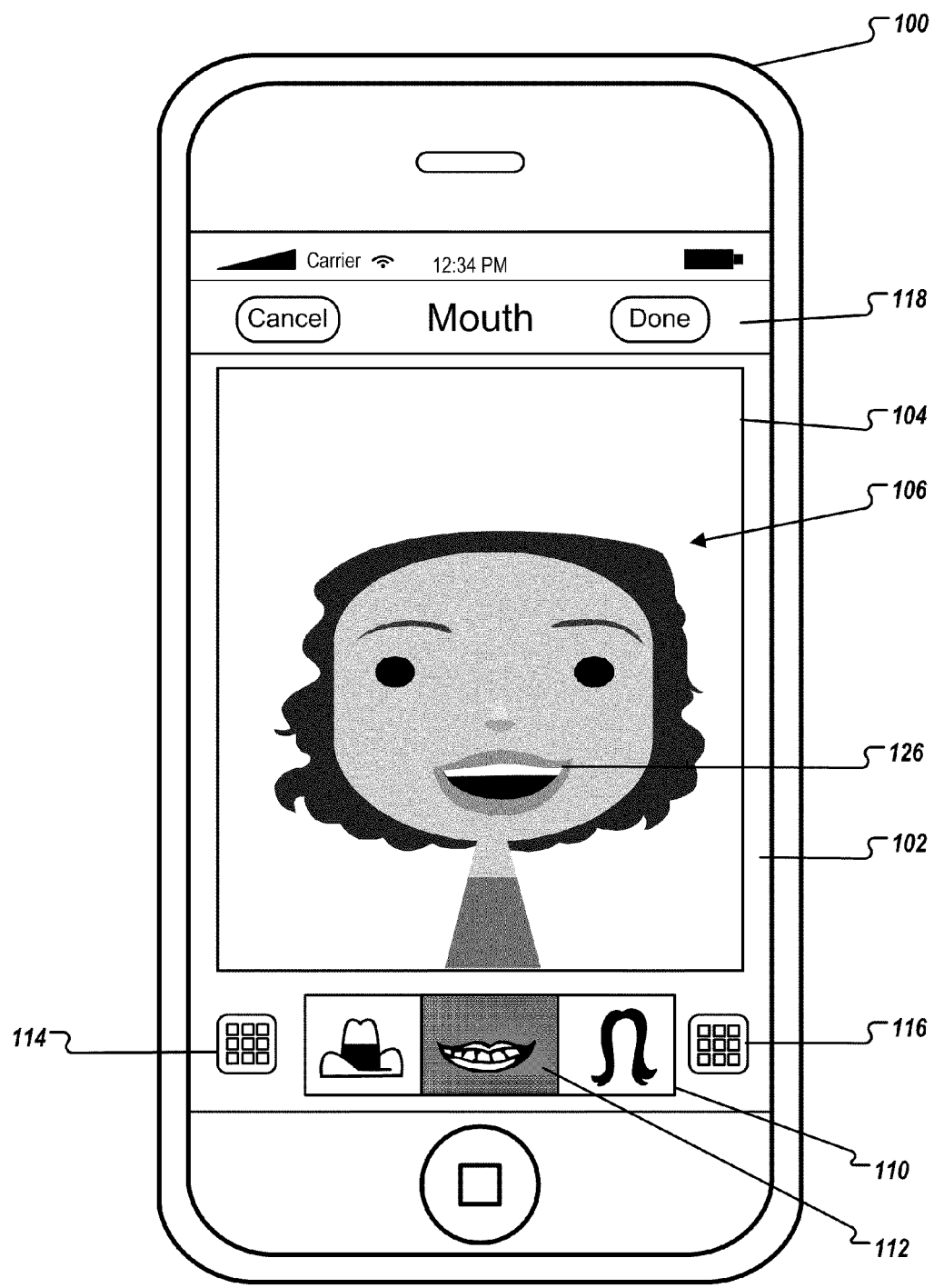
FIGS. 1A-1B illustrate an exemplary avatar editing environment for creating custom avatars.

Overview of Color Customization in a Virtual Operating Environment

A computing device such as a mobile phone, personal data assistants (PDAs), personal computers, game consoles, media players, handheld computers, a navigation device, an email device, an e-book reading device, can include an underlying operating system and various software applications installed in the operating system to provide various application functionalities. Examples of software applications include, web browsers, email applications, word processing applications, address book applications, calendar applications, interactive games, instant messaging applications, photo editing applications, media player applications, games, and so on.

Some applications are standalone applications. A copy of a standalone application can be installed locally in the operating system of a user device and be accessed through that device. Some applications are client-server applications, where a client side application relies on a server-side application for part or all of the client's data and data processing needs.

Each client-server application requires a server-side application installed on one or more server devices. Some server-side applications provide generic web interfaces that are accessible through any web browser applications running on a client device. Other server-side applications require proprietary client-side software to accomplish the data requests and provisions between the client and the server devices.

In some client-server applications, the server communicates with each client separately and allows no real-time interactions between the clients, such as in a web search or web mail context. In some client-server applications, the server creates a unified environment in which multiple clients can interact with one another, such as in an online gaming or social networking contexts. A server-side application can typically keep track of each user and provide personalized data and services based on a user account identifier or a device identifier associated with the user's device.

Developers of software applications typically specify (e.g., in the application program or accompanying libraries) colors, styles, and effects of various user interface elements of the application environment. When the application environment is rendered on a display according to the instructions in the application program, the appearance of the rendered user interface elements reflects the colors, styles, and effects as specified in the application program or accompanying libraries. In this manner, the developers of a software application can create a characteristic look and feel for the application environment. The characteristic look and feel is important for software applications (e.g., games and entertainment titles) where brand recognition and a loyal following audience are crucial to the commercial success of the application.

Some application programs allow users to customize the appearance of the application environment, e.g., the color, styles, and effects associated with various user interface elements in the application environment. Typically, software instructions for a customization interface are included in the application program. When these software instructions are invoked by a user (e.g., by user selection of a customization menu item in a user interface of the application environment) and executed, the customization interface can be presented to the user. The user can enter specific customization data for various appearance aspects of the application environment through the customization interface.

Conventionally, if multiple applications are installed in an operating system, each application has to be individually customized by invoking the customization interface of each application. This can be a time consuming and tedious process. Furthermore, the appearance customization for each application only applies to the user interface elements within the application environment for that application and not other applications.

As described herein, color schemes that apply to multiple applications installed in an operating environment of a user's device or otherwise made available to the user over a network can be influenced by a color profile associated with the user's avatar. Once the color profile of the user's avatar has been established (e.g., in an avatar editing environment), the color schemes for the multiple applications do not have to be individually specified by the user through the native customization interface of each application. Instead, the color schemes for the multiple applications can be derived and applied automatically to each application based on the color and color combination preferences specified for the user's avatar. Color schemes used in the multiple applications do not have to be identical to the colors specified for the user's avatar. Instead, the color schemes can include pleasing color combinations that are characteristic of both the user's avatar and the specific applications.

By utilizing the color profile of the user's avatar, the user is saved from having to individually customize the appearances of user interface elements in each individual application that is installed on his or her device or provided for his or her user account over a network. At the same time, all of the user's applications can be shown with a signature look that is unique to the user.

An Exemplary Avatar Editing Environment

An avatar is a representation of a user or their alter ego. An avatar is often in the form of a three-dimensional (3D) model used in computer games or a two-dimensional (2D) icon or picture used on Internet forums, social networks and other communities. Avatars can also be used in video games, including online interactive gaming environments. Avatars in video games are the player's physical representation in the game world. Online games often provide means for creating varied and sophisticated avatars. In some online games, players can construct a customized avatar for each game by selecting from a number of preset facial structures, hairstyles, skin tones, clothes, accessories, etc. (collectively referred to as "elements") and specify colors for each of the selected elements. Once the user has specified various aspects of his or her avatar, the avatar data can be stored and recalled for rendering the avatar in the game environment. As described herein, the avatar data that the user has specified in one avatar editing environment can be made available to multiple applications and used to customize the application environment of each application.

FIG. 1 illustrates an exemplary avatar editing environment for creating custom avatars. In some implementations, a user of a device 100 (e.g., a mobile device) can invoke an avatar editing application by selecting an icon on a home-screen or by selecting the application through a menu or other input mechanism of an operating system environment of device 100.

Upon invocation of the avatar editing environment, a user interface 104 for the editing environment can be presented on a display 102 of the device 100. Display 102 can be a touch sensitive display or surface responsive to touch or multi-touch input and gestures. Although a mobile device is shown, device 100 can be a desktop computer, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these devices.

Referring to FIG. 1, in some implementations, avatar 106 can be displayed on user interface 104. Avatar 106 can be a 2D or 3D avatar model. Avatar 106 can also be full body avatar. When the editing environment is invoked or the user is creating a new avatar, a default avatar can be displayed on user interface 104. In some implementations, the default avatar can have a blank face for receiving elements selected by the user in the editing environment. In other implementations, a default avatar having predefined elements can be displayed. The default avatar can be automatically created based on user preferences specified in a dialog, for example.

In some implementations, when the user first invokes a game environment on device 100, the user can be presented with a number of predefined avatars and the user can select one as a default avatar. In other implementations, a default avatar can be automatically created on-the-fly based on user preferences for physical characteristics, such as gender, age, hair color, eye color, etc.

In some implementations, when starting with a blank face, the user can add different elements on the blank face, including but not limited to different eyes, ears, mouth (including teeth and smile), nose, eyebrows, hair, beard, moustache, glasses, earrings, hats, and other elements that are associated with physical characteristics of humans and fashion. The user can also change the shape of the avatar's face, the avatar's skin color, and the color of all the elements.

In some implementations, the elements can be 2D textures, which are rendered onto a 3D model of the avatar head. In some implementations, the elements can be 3D objects that are rendered onto the 3D model of the avatar head. For example, a graphics engine can create "eye sockets" in the 3D model and insert 3D "eye" objects into the sockets.

In the avatar editing environment shown in FIG. 1A, the user can select a category associated with the avatar using a category picker. In this example, the user has selected a "Mouth" category from a category picker 110. Similarly to the "Mouth" category, the user can also select other categories associated with the avatar, such as the "Eyes," "Nose," "Hair," "Skin," "Hat," and "Shirt" categories using category picker 110. In some implementations, the user can also select a "Background" category using the category picker 110 to specify a background theme for the avatar. The "Background" theme of the avatar can include background colors, patterns, animations, sounds, and/or other effects that will accompany the appearance of the avatar in the game environment.

In some implementations, category picker 110 can be a bar with icons representing element categories. Text and other visual indicators of categories can also be used. In some implementations, the user can make a swipe gesture on the bar to the left or right to move a different icon into center position 112. In response to the swipe gesture, category picker 110 can be animated so that the category icons move like a wheel on a slot machine. Friction can also be simulated so that acceleration of the wheel can be controlled. For example, a faster gesture results in an increased acceleration of the icons passing through center position 112.

Each time a new category is selected, the selection can be indicated by the category's corresponding icon occupying center position 112 of category picker 110. The icon in center position 112 can be highlighted or otherwise visually enhanced to indicate its selected status. Control region 118 can indicate which category has been selected by displaying the text corresponding to the selected category. An element from the selected category can be automatically added to the appropriate part of the avatar 106 (e.g., eyes to the upper portion of the face, hair on top of the head, and so on).

In the example shown, the "Mouth" category is currently occupying center position 112 and is therefore highlighted to indicate its selected status. An element picker represented by icon 116 was used to select mouth element 126. Upon its selection, the mouth element 126 was added to the face of avatar 106, which had originally been blank. As shown in FIG. 1A, the eyes, hair, and nose of avatar 106 had already been added to the avatar 106 in a similar manner, e.g., by first selecting a corresponding element category in the category picker 110, and then a corresponding element through the element picker 116.

A color picker represented by color picker icon 114 can be selected to invoke a color picker interface that allows the user to select one or more colors and sometime patterns for the selected category. For example, if the "Mouth" category is selected, the color picker interface can be used to select a color for all the mouth elements that can be selected using element picker 116.

Display 102 also includes a control region 118. Control region 118 can include one or more controls (e.g., virtual buttons) for exiting the avatar editing environment. In the example shown, a first virtual button can cancel (e.g., exit) the avatar editing environment without saving changes to avatar 106 (e.g., "Cancel" button). Another button can be used to exit the avatar editing environment and save changes to avatar 106 (e.g., "Done" button).

An Exemplary Element Picker

Figure 1B:
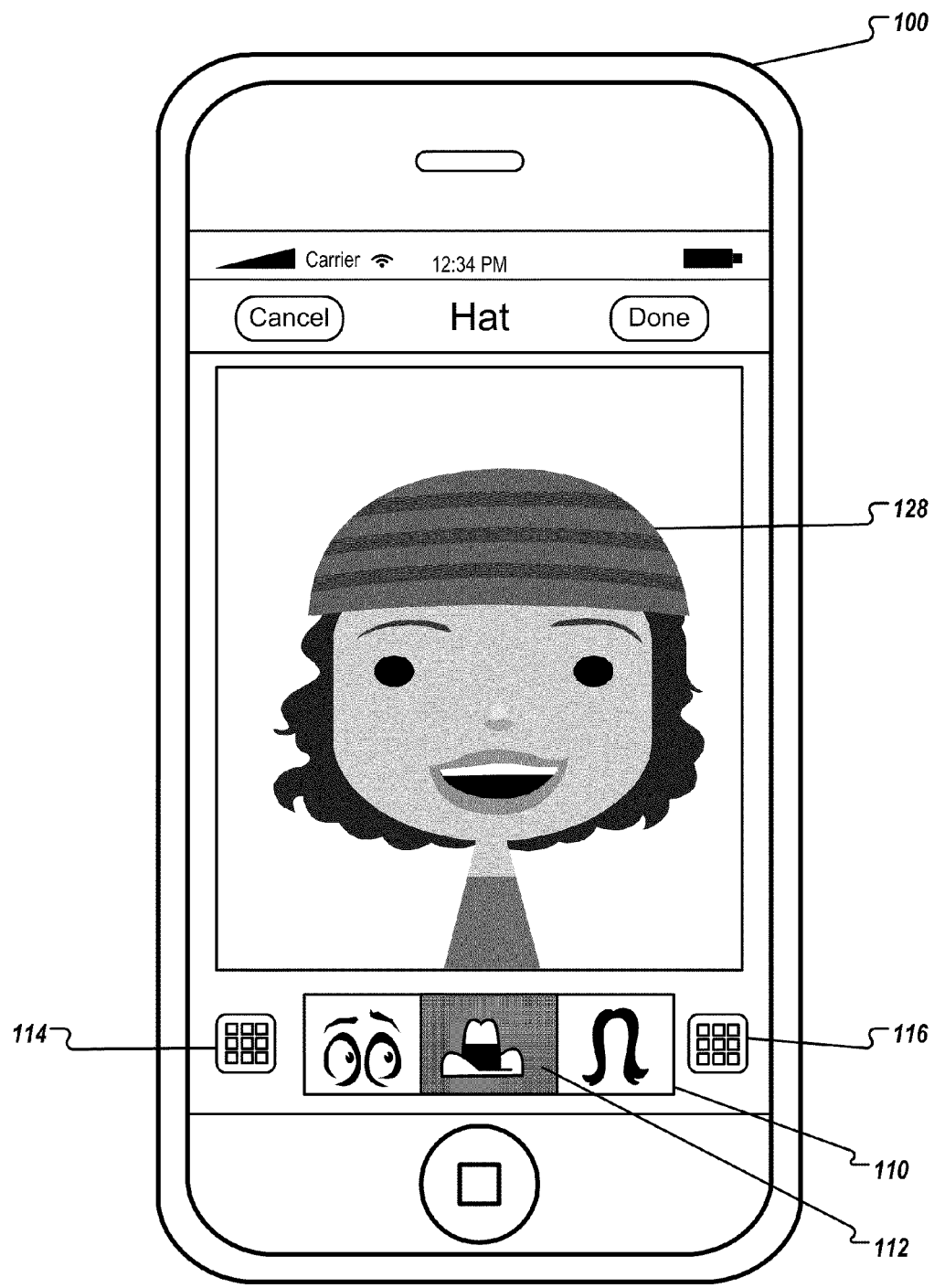
Figure 2A:
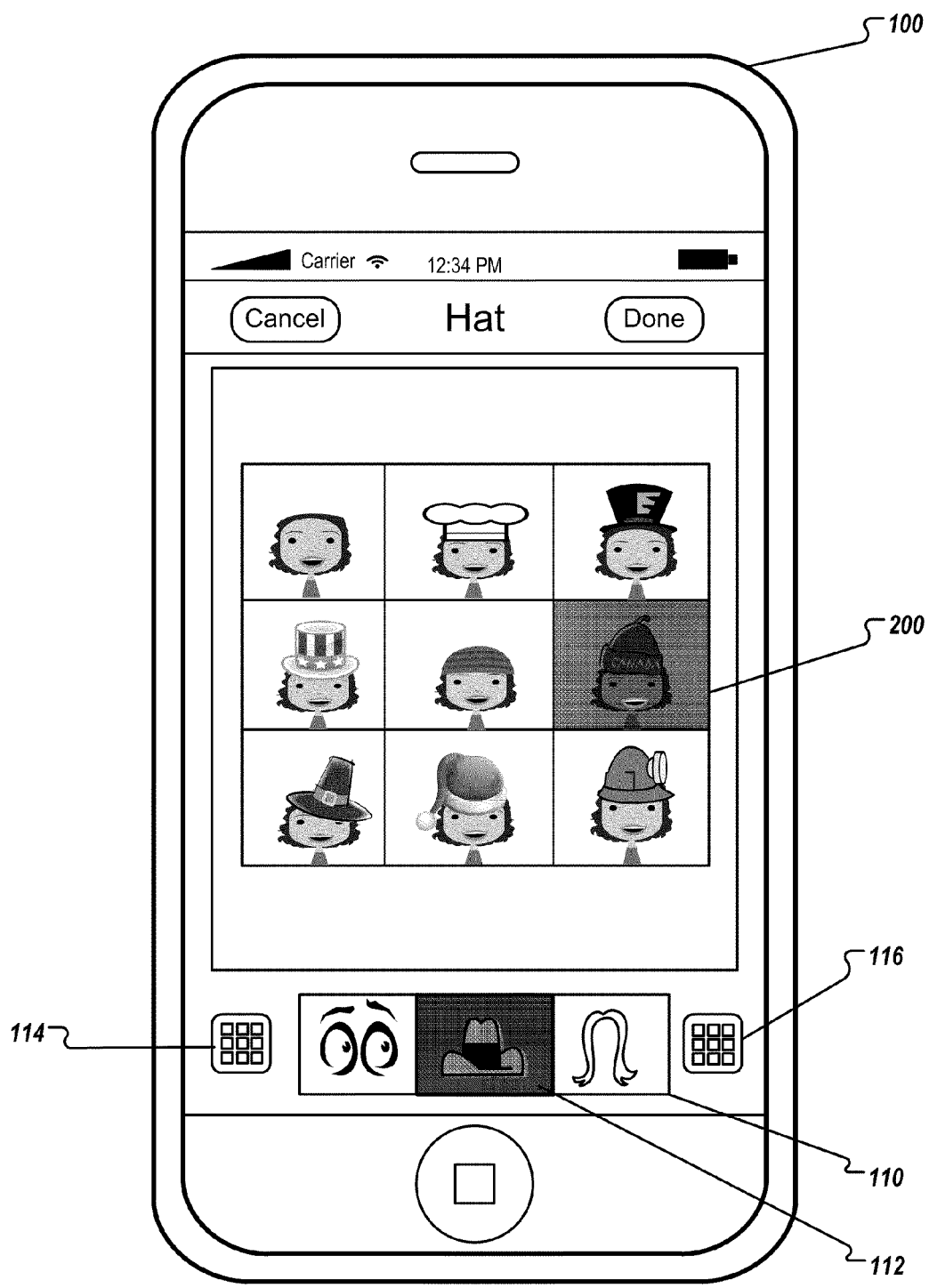
FIG. 2A illustrates an exemplary element picker for selecting avatar elements from a category of avatar elements.

FIG. 1B illustrates the same exemplary avatar editing environment shown in FIG. 1A. As shown in FIG. 1B, the user has selected a new category "Hat," and a default hat element 128 is added to the avatar image shown in user interface 104. When the user has touched or otherwise interacted with element picker icon 116, an element picker interface can be presented. FIG. 2A shows an exemplary element picker interface (e.g., a grid view 200) for selecting an avatar element from a category of avatar elements.

In this example, upon invocation of element picker icon 116, grid view 200 is displayed. Grid view 200 can include a number of cells, where each cell displays an avatar in context with a different element selected from the category of elements. In this example, the "Hat" category was selected, resulting in each avatar displayed in a cell wearing a different hat.

In some implementations, one cell (e.g., top left corner cell in FIG. 2A) can display avatar 106 without the element (e.g., without a hat) for comparison with other cells. Another cell (e.g., center cell) can display avatar 106 with the currently selected element (e.g., a default hat).

The user can select an element by touching or otherwise interacting with the cell displaying the desired element. In this example, the user has selected the third cell in the middle row of grid view 200, where the avatar is shown wearing a "Canada" ski hat. The selected cell can be visually enhanced (e.g., highlighted, colored) to indicate its selected status. Touching the "Done" button can return the user to user interface 104 of the avatar editing environment.

Exemplary Color Pickers

FIGS. 2B-2G illustrate a number of exemplary color pickers for selecting a color for a category of avatar elements or a selected avatar element. In the example shown, the user has touched or otherwise interacted with color picker icon 114. Upon invocation of the color picker icon 114, a color picker interface can be displayed.

Figure 2B:
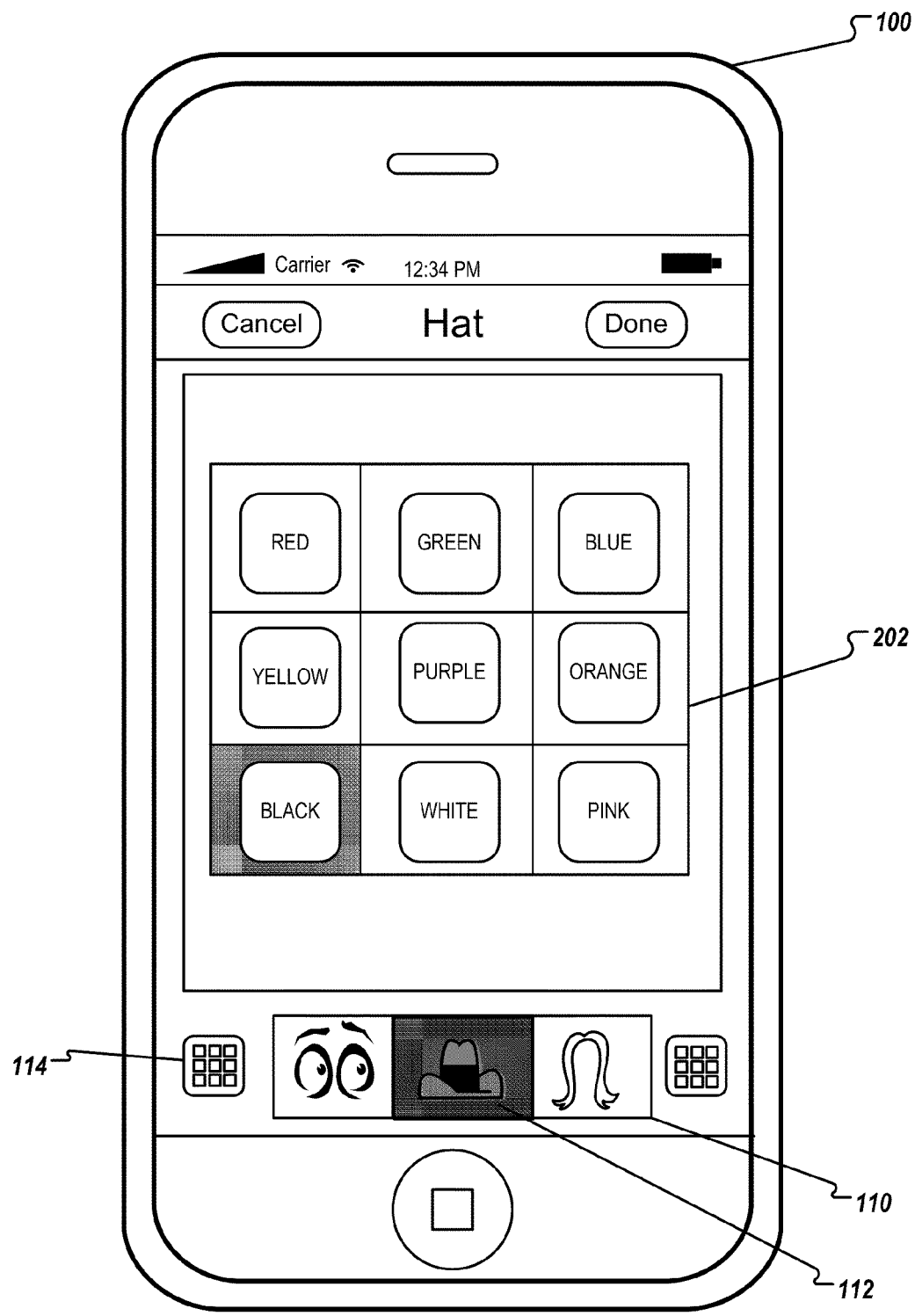
FIG. 2B-2G illustrate various exemplary color pickers for selecting a color for a category of avatar elements or a particular selected avatar element.

FIG. 2B shows an exemplary color picker interface in the form of a grid view 202. The grid view 202 can include a number of cells, where each cell displays a different color. In this example, the color black was selected, resulting in each avatar displayed in cells of grid view 200 wearing a different black hat. The color selected in the color picker can be applied to all elements in the category selected by the category picker.

In some implementations, the color selected in the color picker can be applied to only the currently selected element in the currently selected category. In such implementations, if the color black were selected, the black color would only be applied to the "Canada" ski hat shown in grid view 200.

In some implementations, whether the selected color applies to all elements in the currently selected category or just the currently selected element in the category depends on where the color picker icon 114 was invoked. For example, if the user has invoked color picker icon 114 from the main avatar editing interface (e.g., as those shown in FIGS. 1A and 1B), then the color(s) selected in the color picker interface can be applied to all elements in the currently selected category. Alternatively, if the user has invoked the color picker icon 114 from the element picker interface (as that shown in FIG. 2A), the color(s) selected in the color picker interface can be applied to only the currently selected element in the currently selected category.

In some implementations, if the selected color is to be applied to a currently selected element, the grid view 202 can display the selected element in the different colors represented by each cell. For example, the "Red" cell can display a red "Canada" ski hat, the "Green" cell can display a green "Canada" ski hat, the "Black" cell can display a black "Canada" ski hat, and so on. In some implementations, the entire avatar image can be displayed in the grid view showing how the selected element in the different colors would look with other existing elements of the avatar.

In some implementations, the colors displayed in grid view 202 (namely the "suggested colors") can be limited based on the category selected. For example, if the "Nose" category is selected, then grid view 202 may display different skin tones. If the "Eyes" category is selected, then grid view 202 may display various shades of blue, green, brown, and hazel, etc. For example, if the "Hat" category is selected, then the grid view 202 may display colors that coordinate well with the eye, hair, and/or skin colors that have already been specified by the user. The selection of suggested colors can be based on known color heuristics. In some implementations, the color picker may include a user element that the user can invoke to see a broader range or selection of colors than those initially presented.

Figure 2C:
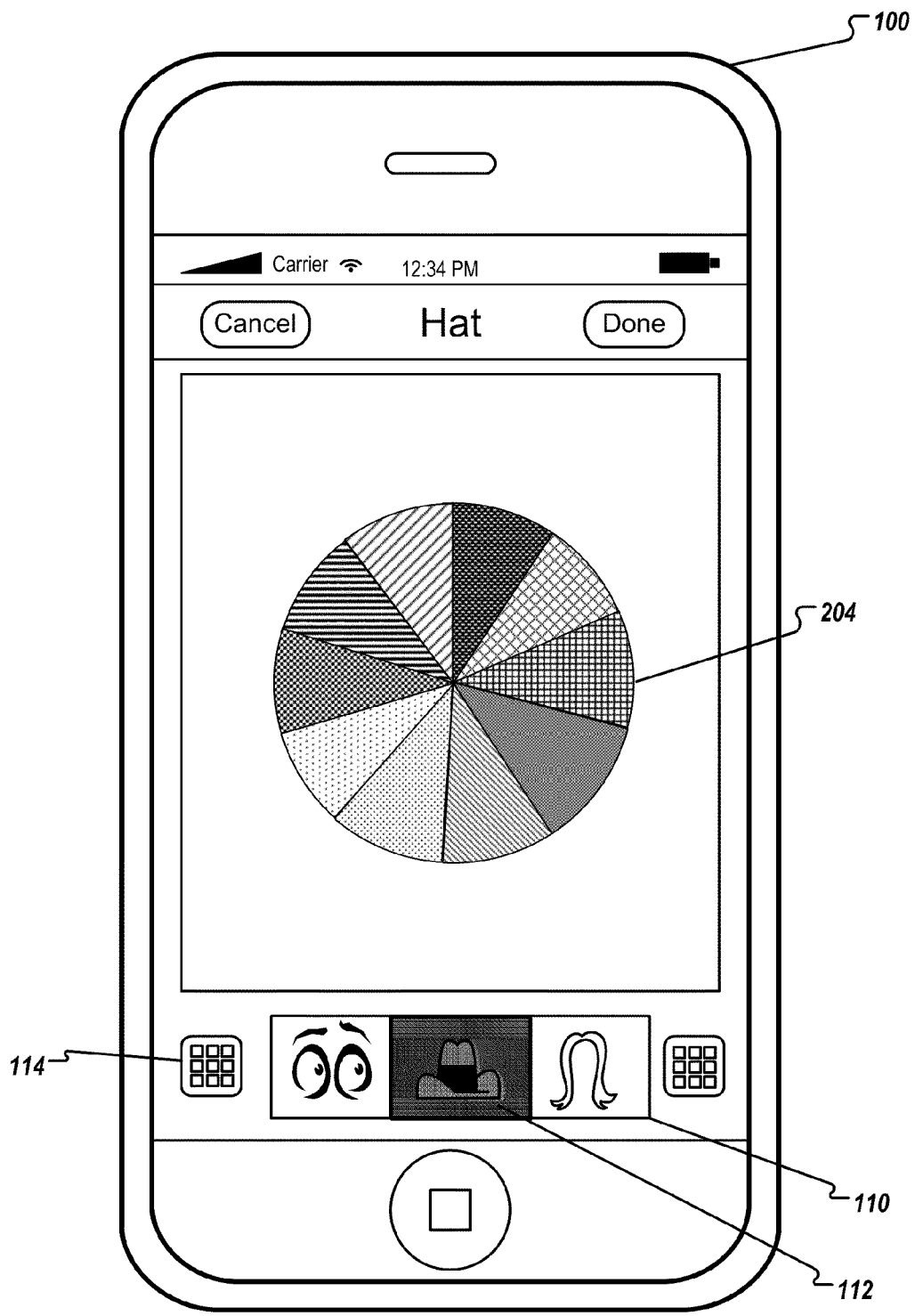

In addition to the color picker interface presented in FIG. 2B, other color picker interfaces can be implemented. FIG. 2C shows another exemplary color picker in the form of a color wheel 204. Color wheel 204 can show a number of discrete colors, each color occupying one slice or one region of color wheel 204. The colors shown in the color wheel can be limited based on the particular element category that is currently selected. The user can touch or otherwise interact with each slice or region of color wheel 204 to select the color shown in the slice or region. In some implementations, if the user selects a color by touching or otherwise interacting with a region on color wheel 204, color wheel 204 changes to display various shades of the selected color to allow fine-tuning of the selected color.

In some implementations, color wheel 204 can include a continuous gradient of colors, where the transition of colors from one region to an adjacent region is continuous. In some implementations, the user can zoom into a particular region to see a particular range of adjacent colors, and to select colors from that zoomed region on the color wheel. In some implementations, if the user interacts with a region on color wheel 204 (e.g., through a reverse-pinching multi-touch gesture), color wheel 204 can change to display a zoomed view of that region. The user can grab and move the zoomed region to show other adjacent regions of color wheel 204 in the display. The user can select a color from the zoomed region by touching or otherwise interacting with the zoomed region.

Figure 2D:
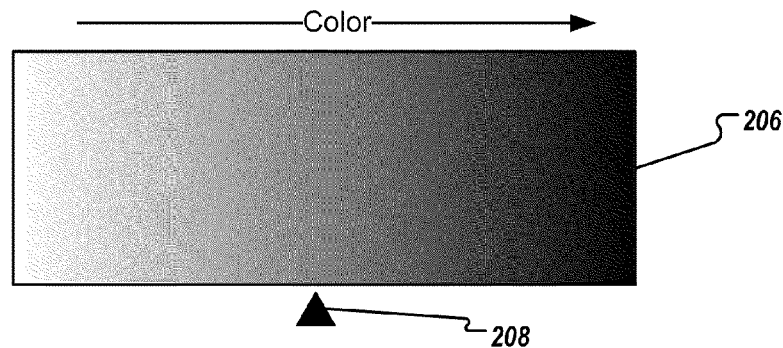

FIG. 2D shows another exemplary color picker in the form of a color band 206. In some implementations, the colors shown in color band 206 are discrete colors (e.g., red, orange, yellow, green, blue, purple, white, black, and so on). In some implementations, the colors shown in color band 206 are different shades (e.g., from light to dark) of the same color (e.g., red). In some implementations, color band 206 shows a continuous gradient of different colors (e.g., as shown in a continuous color spectrum). In some implementations, the colors shown in color bar 206 are suggested based on the currently selected element category. For example, when the currently selected element category is "Eyes," the colors shown in color bar 206 would include different shades of brown, blue, green, and hazel. In some implementations, color bar 206 can be presented with a user interface element for expand the range or collection of colors that are currently shown.

In some implementations, the user can touch or otherwise interact with color bar 206 directly to select the colors shown in different regions in color bar 206. In some implementations, the color picker interface includes an indicator 208 that indicates a currently selected color. The user can grab and drag indicator 208 along color bar 206 to a position showing the user's desired color.

Figure 2E:
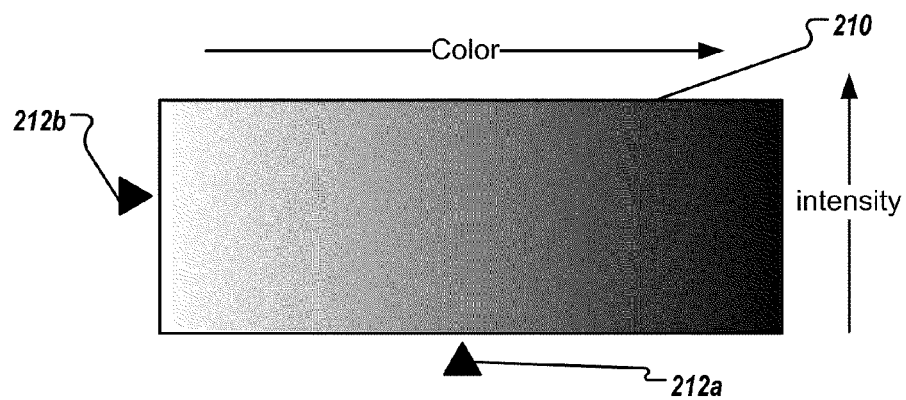

FIG. 2E shows another exemplary color picker in the form of a two-dimensional color bar 210. In color bar 210, positions along the first dimension indicates different colors or hues (either discrete or continuous colors), while positions along the second dimension indicates different shades (e.g., from light to dark) of the same color or hue. In some implementations, color picker 210 also includes indicators 212a and 212b to indicate the currently selected color and shade. In some implementations, positions along the second dimension of color bar 208 can indicate other optical properties, such as intensity, transparency, or saturation of the same color.

Figure 2F:
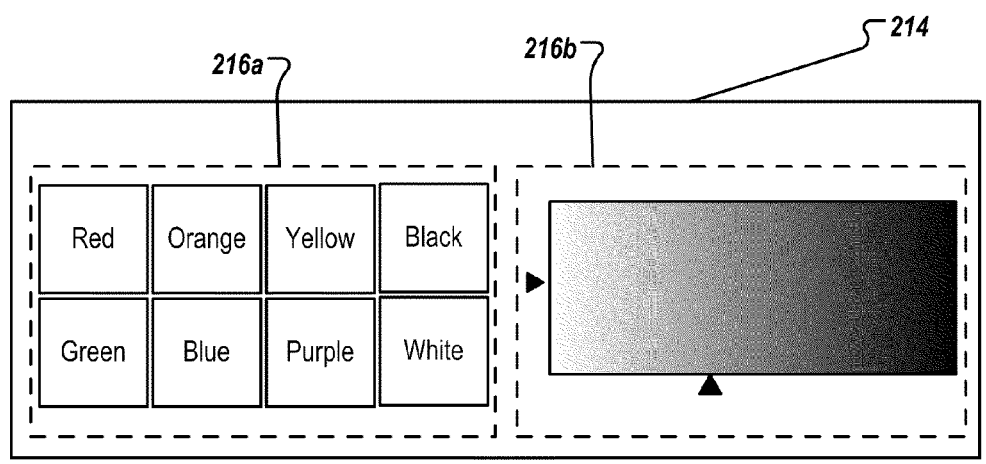

FIG. 2F shows another exemplary color picker in a hybrid form. The hybrid color picker 214 includes a coarse color selection portion 216a and a fine color selection portion 216b. In some implementations, coarse color selection portion 216a displays a limited number of discrete colors or basic hues (e.g., red, orange, yellow, green, blue, purple, black, and white). Coarse color selection portion 216a can be implemented using a color grid or color wheel as shown in FIGS. 2B and 2C, for example. The user can use coarse color selection portion 216a to choose a basic color that is roughly what he or she would like to have for the currently selected element category.

Once the user has selected a color from coarse color selection portion 216a, fine color selection portion 216b can be updated to show an expanded range of colors that fall around the selected basic color in a color spectrum. In some implementations, fine color selection portion 216b can be implemented using the one-dimensional or two-dimensional color bars shown in FIGS. 2D-2E, for example. The user can select the exact color he or she wants using fine color selection portion 216b.

As a more specific example, if the user has selected the color "red" in coarse color selection portion 216a, the user can select from a continuous range of colors from orange red to purple red in the fine color selection portion 216b. If the fine color selection portion 216b also includes a second dimension for intensity or transparency, the user can make a selection for the intensity or transparency as well.

In some implementations, if the color picker interface is invoked from an element picker interface, the currently selected element can be shown in the color picker interface to show the selected colors in context. For example, if the user selects an eye in the element picker, and then invokes the color picker icon 114, a zoomed view of the selected eye can be shown in the color picker interface along with a color picker (e.g., color wheel 204, color bar 206, etc.).

Figure 2G:
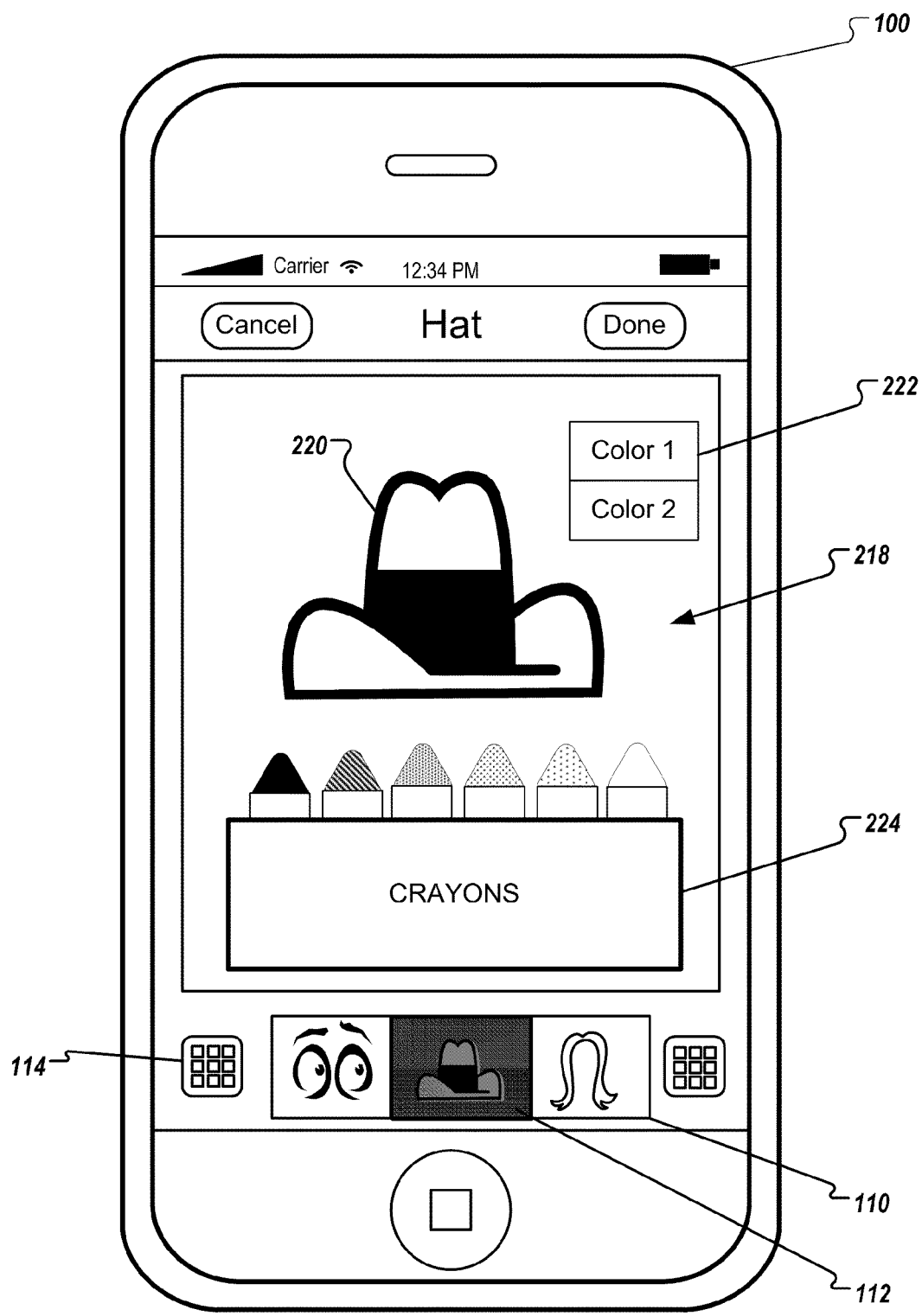

In some implementations, if the selected element includes multiple regions in different colors, the user can select the color for each region separately in the color picker interface. FIG. 2G shows an exemplary color picker interface 218 for choosing colors for a multi-color element. In this example, the user has selected the "Hat" category in the category picker, and selected a cowboy hat in the element picker. After selecting the cowboy hat, the user invoked color picker icon 114 and color picker interface 218 is presented.

In this example, the currently selected element (e.g., cowboy hat 220) is shown in color picker interface 218. Cowboy hat 218 has two colors, one color for the hat body, and the other color for the band. In some implementations, color picker interface 218 can display a menu (e.g., menu 222) of regions for which separate color selection is possible. In some implementations, menu 220 can show the current colors of the different regions in the selected element. The detection of the regions in the selected element can be accomplished by image processing techniques to identify color boundaries in the default image of the element.

In some implementations, the user can select a region from the menu, and then selects a color for that region from the color picker available in color picker interface 218. In some implementations, the user can select a region directly in the image of the selected element (e.g., by touching or otherwise interacting with the region of the image on the touch-sensitive display or surface) and then select the color for that region from the color picker. The user can then select a different region in the image of the selected element, and then select the color for the newly selected region.

In this example, a color picker in the form of a crayon box 224 is shown in color picker interface 218. The user can select a crayon from crayon box 224 to color a currently selected region in the selected element. In some implementations, animation can be implemented to show the coloring process, e.g., the crayon being pulled out of the box and used to paint the selected region of the element. In some implementations, other forms of color pickers (e.g., the color pickers shown in FIGS. 2B-2G) can be used. In some implementations, the kinds of colors pickers that are presented in the color picker interface can depend on the particular element or category of elements that are to be colored.

In some implementations, the color picker interface also allows selection of patterns or textures for a selected element. For example, if the "Background" category is selected, the color picker interface can be used to select not only a single-colored background, but also single-colored or multi-colored patterns as the background.

For example, a user can select a pattern with thin blue stripes over a white background, a pattern with rainbow colored stars over dark blue background, a pattern with silver snowflakes over black background, and so on. In some implementations, the user can select an image from a collection of image files to use the image as the background for the avatar. In some implementations, the user can select an animation to use as the background for the avatar. In some implementation, the user can select a pattern and then select a method to animate the pattern (e.g., fading in and out, or sliding vertically, etc.) in the background of the avatar.

Once the user has completed the customization of his or her avatar, the user can save the avatar data and exit the avatar editing environment (e.g., by selecting the "Done"

button in control area 118). In some implementations, the avatar data can be saved locally on user device 100. In some implementations, the avatar data can be uploaded to a remote server and stored in association with the user's online account at the remote server. The avatar data can be made accessible to multiple applications installed on device 100 or otherwise made available to the user at various locations (e.g., through a network service to the user's account).

In some implementations, the custom avatar can be used in variety of applications, including but not limited to address books, chat sessions, video conferencing, email, games, or any other application that can support an avatar. In a video chat environment, each party can be represented by an avatar rather than a digital image. In an online game environment, the custom avatar can replace the default avatar in the game to perform various tasks in the game world.

In some implementations, a color profile can be derived based on the color selections the user has made for his or her avatar in the avatar editing interface. In some implementations, the color profile can include the exact colors that the user has specified for various elements of his or her avatar. Some colors may be considered more important than others or more reflective of the user's personal color preferences. For example, skin color may be given less weight in the color profile than a background color, a clothing color, or an accessory color for the avatar.

In some implementations, the color profile of the avatar can also include general color preferences of the user that are deduced from the color selections the user has made for his or her avatar. For example, based on the colors selected for the avatar, it can be determined whether the user prefers cooler or warmer tones, lighter shades or darker shades, bright colors or more subdued colors, strong contrasting colors or similar colors, and so on.

In some implementations, the avatar editing environment may allow the user to include additional styles (e.g., modern, classic, cute, etc.) and effects (e.g., music, sound effects, animation effects, etc.) that accompany the avatar. In some implementations, the color profile of the avatar can be expanded to include this information as well.

The colors selected for the avatar and the deduced color and color combination preferences in the color profile can both be used to select suitable color schemes for other applications of the user. Using the information in the color profile of the avatar, color combinations that are both visually pleasing and characteristic of the user's personal preferences can be generated and used for different applications installed on the user's device or otherwise made available to the user (e.g., through an online interface).

For example, if the user has specified a red background for his or her avatar, the user's applications can be modified to show user interface elements in various shades of red colors. Sometimes, hues, intensities, and transparency levels of the colors can be varied to create sufficient contrast between the user interface elements and at the same time still convey the characteristic look and feel unique to the user. The exact color qualities chosen for the user interface elements can be based on a set of user specified or standard color matching heuristics.

An Example Game Environment

Figure 3:
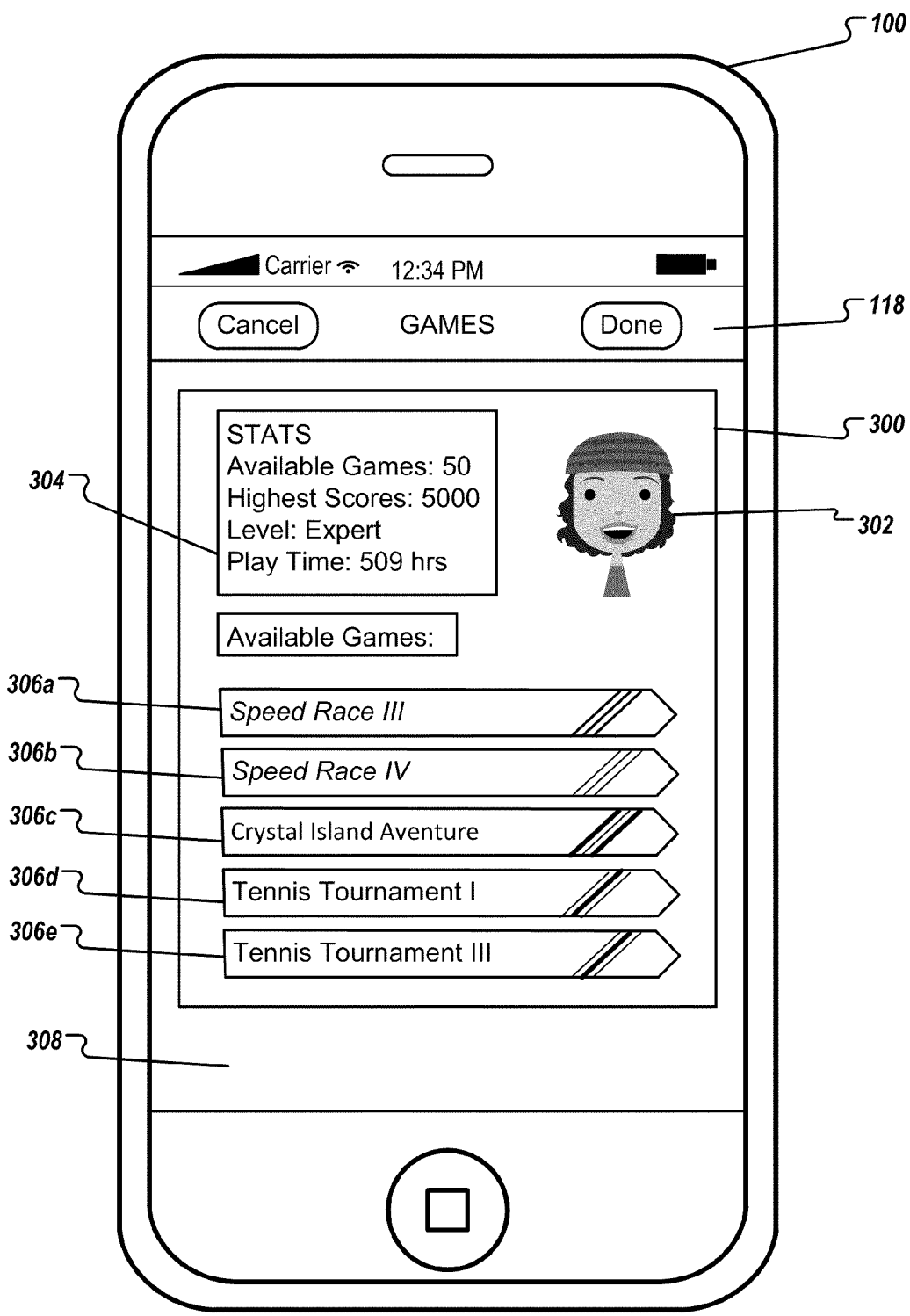
FIG. 3 illustrates an exemplary application selection interface having user interface elements customized according to the color profile of a user's avatar.

FIG. 3 shows an exemplary game selection interface 300 in a game environment on device 100. Exemplary game selection interface 300 allows the user to select a game from a collection of games that have been installed on the user's device or otherwise made available to the user (e.g., via download or online access). Once the user has selected a game from game selection interface 300, the user interfaces related to the selected game can be presented. In some implementations, a general application selection interface can be implemented for the user to select any application from a collection of applications that have been installed on the user's device or otherwise made available to the user (e.g., via download or online access).

In this example, game selection interface 300 presents an image of the user's avatar 302. In some implementations, the image of the user's avatar 302 can be reconstructed from the avatar data that has been stored for the user on device 100 or at a remote server. In some implementations, avatar 302 can be animated to track the movement of the user's pointing device on the display (e.g., by looking in the direction of the user's fingertip on the touch-sensitive display or surface).

In some implementations, game selection interface 300 can include various user interface elements (e.g., area 304) for displaying information about the game environment, such as the number of games installed on the device and/or available to the user online, the user's playing statistics, a list of user's game partners including their respective avatars, and so on.

In some implementations, game selection interface 300 may also include other user interface element for entering the avatar editing environment or customization interface for other aspects of the game environment. In some implementations, the customization interface for the game environment can allow the user to provide additional personal preference information about the colors, styles, sounds, and animation effects that are used in the game environment.

In some implementations, game selection interface 300 includes a number of user interface elements (e.g., menu items 306*a*-306*e*) showing the different games that are available to the user. The menu items can be automatically added to game selection interface 300 after the user has installed the game programs on the user's device, or after the user has added the games to his or her account through an online game server.

In some implementations, when a game developer submits a new game program to the online game server, and the online game server decides to make the game available for purchase or download by users, the online game server can add a menu item for the new game to the game selection interfaces of all user devices in communication with the gamer server. In some implementations, the menu item for new games can be displayed in a dedicated section of the game selection interfaces. In some implementations, the menu item for new games can be displayed among the menu items for all other games. Some indication may be provided on the menu item for new games to indicate their new game status.

In some implementations, when the user selects a game from game selection interface 300 (e.g., by touching or otherwise interacting with the game's corresponding menu item on the touch-sensitive display), the user interfaces related to the selected game can be displayed. For example, the selected game can be executed, and the user can begin playing the game. Alternatively, if a new game is selected, the user interfaces can include further information about the new game, instructions, and controls for downloading or installing the new game.

In some implementations, game selection interface 300 can be rendered in a color scheme to reflect the colors used by the user for his or her avatar, so that game selection interface 300 presents a look and feel that is characteristic of the user's avatar. For example, in game selection interface 300, the background (e.g., background 308), the information areas (e.g., area 304), the menu items (e.g., menu items 306a-306e), and other user interface elements (e.g., the user interface elements in control area 118), can be rendered in a color scheme created based on the information stored in the color profile of the user's avatar.

The color scheme for game selection interface 300 can include a different color for each user interface element in game selection interface 300, for example, a color for the background, a color for the text, a color for the menu items, a color for the buttons, and so on. Each color does not have to be an exact color that was selected for an element of the user's avatar. Instead, the colors of the user interface elements may be a combination of the original default colors of the user interface elements and one or more colors selected from the avatar's color profile.

For example, if the default color of a user interface element is silver, and the user has selected the color orange as the avatar's background color, then the user interface element can be rendered in silver but with an orange overtone. Similarly, other user interface elements can be rendered in various shades of orange hues over the original colors of the user interface elements. Overall, game selection interface 300 can show the background in dark orange, the menu items in their various original colors with light orange overtones, and the game statistics in black text over medium orange background.

In some implementations, the colors selected for the user interface elements can also take into account of the color combination preferences derived from the colors selected for the user's avatar. For example, if the user has selected the color orange as the avatar's background color, and selected a color purple for the avatar's shirt, it may be deduced that the user prefers strongly contrasting colors. This preference may be stored in the avatar's color profile. When creating a color scheme for game selection interface 300, if one set of user interface elements takes on the orange tones, another set of user interface elements can take on the purple tones. Adjacent user interface elements can be rendered with strong contrast in brightness and/or colors. Text may be shown in bright yellow over black background to create strong visual impact.

In some implementations, the menu items or other user interface elements pertaining to an individual game can be rendered to reflect both the characteristic colors of the game and the characteristic colors of the user's avatar. The characteristics colors of the game can be provided by the game developer when the game is submitted to the game server. In some implementations, the game developer can specify which colors are the game's characteristic colors and whether the colors can be modified. In some cases, the game developer does not want their games' characteristic colors modified for fear of creating dilution of their brands. The game developers' preferences for color customization can be specified in accordance with an Application Programming Interface (API).

In some implementations, if a game program does not have its characteristic colors specified, the characteristic colors can be derived from game arts or icon graphics submitted with the game software. For example, most games include splash screens or game art for display during game loading or level change. These screen graphics and game art can be analyzed to determine one or more dominant colors for the graphics. In some implementations, the color complexity of the game graphics are reduced by converting each complex color into one of a limited number of basic colors (e.g., red, orange, yellow, blue, green, purple, black, white, etc.). Then, the dominant colors can be selected from the limited number of basic colors based on the areas each color occupies in the game graphics. In some implementations, the central area is given more weight than the background or peripheral areas in the game graphics.

In some implementations, the game icon that is submitted with the game program can be analyzed to extract the characteristic colors for the game. For example, the game icon for a tennis game can include a yellow tennis ball over a blue background, and a red ribbon running across the tennis ball. There may also be white text for the game version on the icon. Based on color content analysis of the game icon, it can be determined that blue occupies the most area, followed by yellow and red, and white occupies the least area in the icon. Since the areas occupied by the blue color are mostly in the peripheral regions of the icon graphic, blue is not considered the dominant color of the icon. Instead, yellow and red are considered as the dominant colors of the icon. The characteristic colors of the tennis game are therefore determined to be yellow and red.

In some implementations, the determination of the game characteristic colors can be performed by the game server, and the characteristic color information can be stored on the server and used to create color schemes for game selection interface 300. For example, menu items 306d and 306e represent two tennis game titles for which the characteristic colors have been determined to be yellow and red. In some implementations, menu items 306d and 306e can be rendered with yellow and red stripes or patterns over an orange background, orange being a color from the avatar's color profile. In some implementations, in order to create visual contrast, the orange background of menu items 306d and 306e can be in a darker shade, while the yellow and red stripes or patterns can be presented in bright and opaque shades over the dark orange background. By including the game characteristic colors in the menu items in game selection menu 300, the user is able to visually differentiate the different game titles at a glance.

In some implementations, the avatar's color profile can be used to customize the colors inside the games as well. For example, the game developers can allow certain textures inside the game world to be modifiable based on the color profile of the user's avatar. Taking the tennis game as a specific example, the game developers can allow certain background textures, such as the audience's clothing, banners in the stadium, the score boards, and so on, to take on the colors specified in the avatar's color profile. This can be accomplished by writing the game program according to an API that allows modification of certain resources and textures used in the game world.

In some implementations, if the game is an online game, and the user is interacting with other players in the game world, the textures in the game world can be modified to show influences from the color profiles from each player's avatar. For example, some audience can be shown to wear the colors for one player's avatar, and other audience can be shown to wear the colors of another' player's avatar. In some implementations, the colors shown in the game world can be modified according to various color heuristics to create visually pleasing effects while adhering to the characteristic look and feel of the players' avatars.

Exemplary Processes for Color Customization in an Operating Environment

Figure 4:
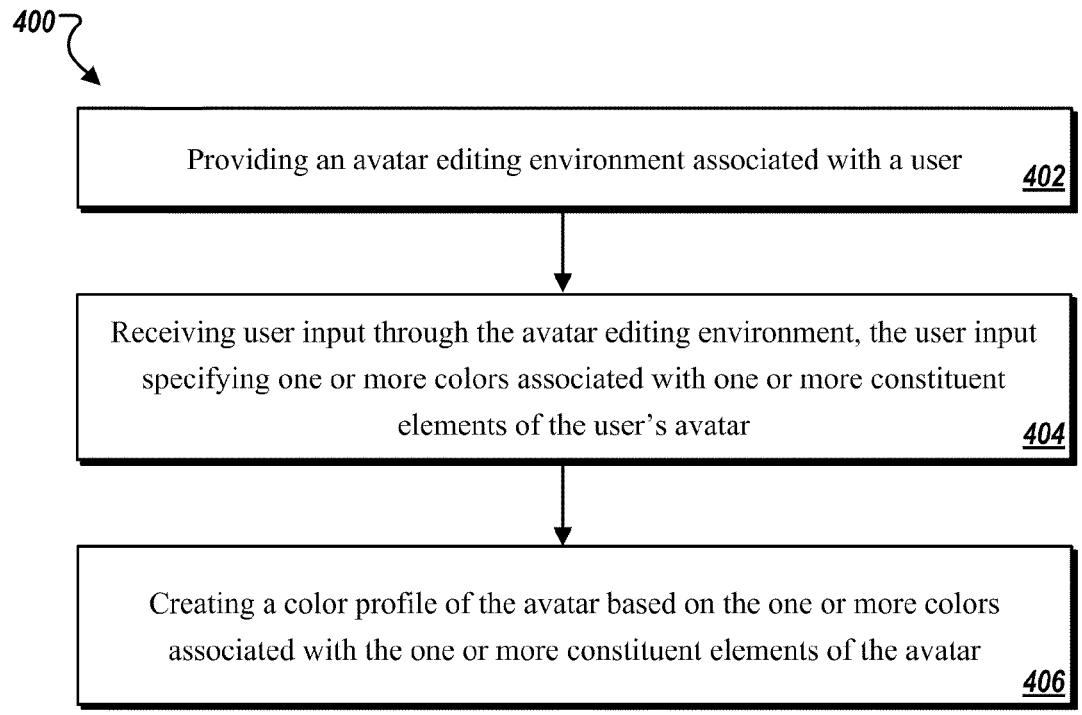
FIG. 4 is a flow diagram of an exemplary process for creating a color profile for a user's avatar.

FIG. 4 is a flow diagram of an exemplary process 400 for creating a color profile for a user's avatar. The process can be accomplished through an avatar editing environment such as that shown in FIGS. 1-2.

In some implementations, process 400 begins when an avatar editing environment associated with a user is provided (402). The avatar editing environment can be provided by a program executing locally on a user's device, or provided through an online interface by a remote server. The avatar editing environment can be associated with the user by the user's identifier for a local account on the device or an online account at the remote server.

Then, user input is received through the avatar editing environment, where the user input specifies one or more colors associated with one or more constituent elements of the avatar (404). In some implementations, the constituent elements of the avatar include the avatar's facial features, hair, accessories, clothing, and/or background of the avatar.

After the user has specified the avatar data in the avatar editing environment, a color profile of the avatar can be created based on the one or more colors associated with the one or more constituent elements of the avatar (406). In some implementations, the color profile of the avatar not only includes the exact colors specified by the users, but also color and color combination preferences derived from the colors selected by the user for the avatar.

In some implementations, during the avatar editing process, first user input selecting one of the one or more constituent elements of the avatar is received. In some implementations, the first user input selecting a constituent element can include user input selecting an element category from a category picker and/or user input selecting an element from an element picker as shown in FIGS. 1A, 1B, and 2A.

In some implementations, after an element or element category is selected, second user input invoking a color picker in the avatar editing environment can be received, where the color picker shows a plurality of suggested colors. In some implementations, the suggested colors can be provided based on the currently selected element and/or element category.

In some implementations, after the color picker is presented, third user input selecting one of the plurality of suggested colors from the color picker can be received, and the selected color can be associated with the selected constituent element of the avatar.

In some implementations, the color picker presents a plurality of discrete colors for selection. In some implementations, the color picker presents a gradient of colors for selection. In some implementations, the color picker presents the selected element in a plurality of suggested colors. In some implementations, the color picker presents a color gradient in a first dimension, and an intensity gradient in a second dimension.

In some implementations, the color picker presents a coarse color selection portion and a fine color selection portion, where the coarse color selection portion presents a plurality of discrete colors for selection, and the fine color selection portion presents different shades of a currently selected color indicated in the coarse color selection portion.

In some implementations, the color picker presents a zoomed image of the selected element and allows independent color selection for each of multiple portions of the selected element. More details of the color pickers can be found in FIGS. 2B-2G and accompanying descriptions.

Figure 5:
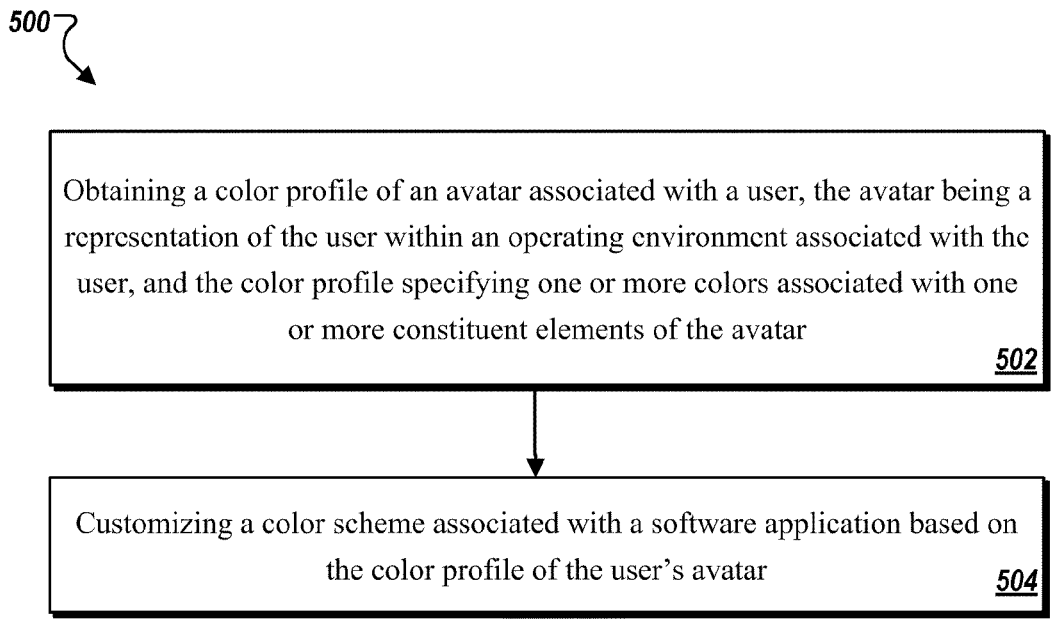
FIG. 5 is a flow diagram of an exemplary process for customizing an application environment for a user based on the color profile of the user's avatar.

FIG. 5 is a flow diagram of an exemplary process 500 for customizing an application environment (e.g., a game environment) for a user based the color profile of the user's avatar. In some implementations, the process 500 starts when a color profile of an avatar associated with a user is obtained (502). The avatar is a figurative representation of the user within an operating environment associated with the user. The color profile of the avatar specifies one or more colors associated with one or more constituent elements of the avatar.

Then, a color scheme associated with a software application can be customized based on the color profile of the user's avatar (504). In this case, the color profile of the user's avatar has been specified outside of a customization environment specific to the software application. In other words, the avatar editing environment exists outside of the native customization environment of individual application programs available in the operating environment. The user only needs to specify color information in the avatar editing environment and does not have to go into the customization environment specific to each software application in order to apply his or her color preferences and choices to user interface elements of those software applications.

In some implementations, in addition to customizing the user interface elements in an application environment, a default avatar in the application environment can be replaced by the user's customized avatar. For example, the avatar data can be provided to the software application executing in the operating environment, the avatar data operable for creating the avatar in an application environment, and a customized avatar is created based on the avatar data to replace a default avatar in the application environment.

Figure 6A:
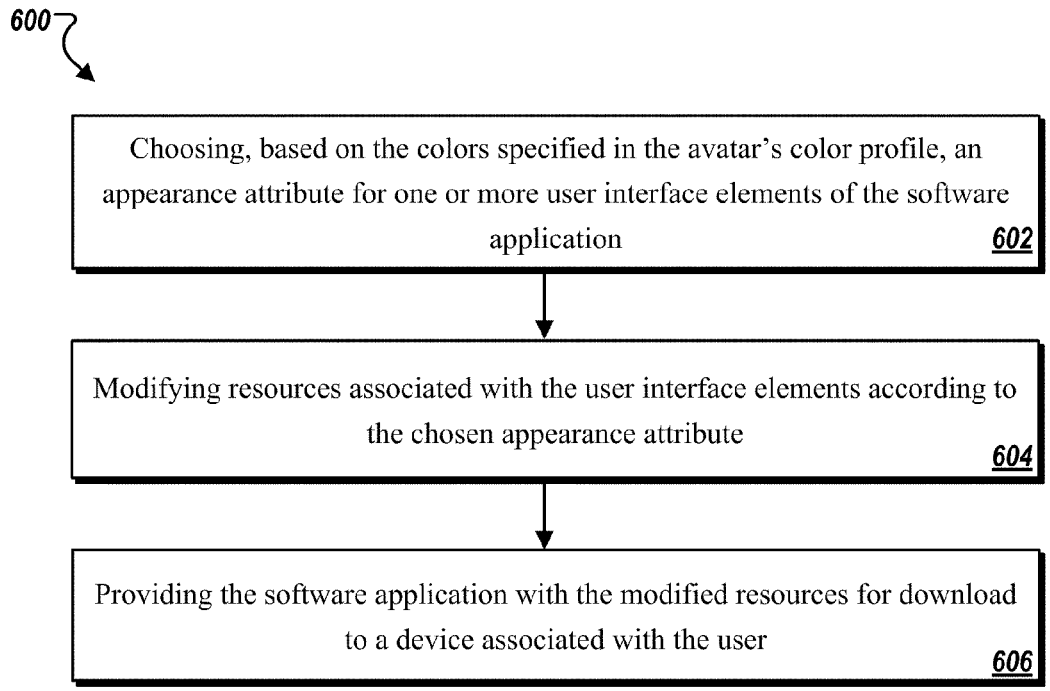
FIG. 6A is a flow diagram of an exemplary process for server-side customization of an application environment based on the color profile of a user's avatar.

FIG. 6A is a flow diagram of an exemplary process 600 for server-side customization of the application environment based on the color profile of a user's avatar. In some implementations, process 600 starts when an appearance attribute for one or more user interface elements of the software application is chosen based on the colors specified in the avatar's color profile (602). The appearance attribute can be a color or color combination, a transparency, hue or other visual properties for the user interface element. In some implementations, the appearance attribute can also include animation effects, fonts, and/or patterns for the user interface elements. The appearance attribute can be chosen according to various standard color matching heuristics and to the color preferences specified in the color profile of the avatar. In some implementations, the appearance attribute also takes into account of the original color attributes of the user interface elements to preserve some of the authentic look of the user interface elements after the customization.

In some implementations, resources associated with the user interface elements can be modified according to the chosen appearance attribute (604). The software application with the modified resources can be provided for download to a device associated with the user (606).

In some implementations, developers of application programs specify the appearance attributes of user interface elements in the application environment in terms of textures or parameters. By modifying these textures and parameters based on the color profile of a user's avatar, the application server can customize the applications before the application programs are downloaded and installed on the device of the user. When the user downloads and installs the customized program(s) locally on his or her device, the user interface elements would be rendered according to the modified resources and reflect the color preferences of the user. In some implementations, where the user accesses the application programs via an online interface, the application server can provide the customized application data that the client device can use to render the customized user interface elements in the application environment.

Figure 6B:
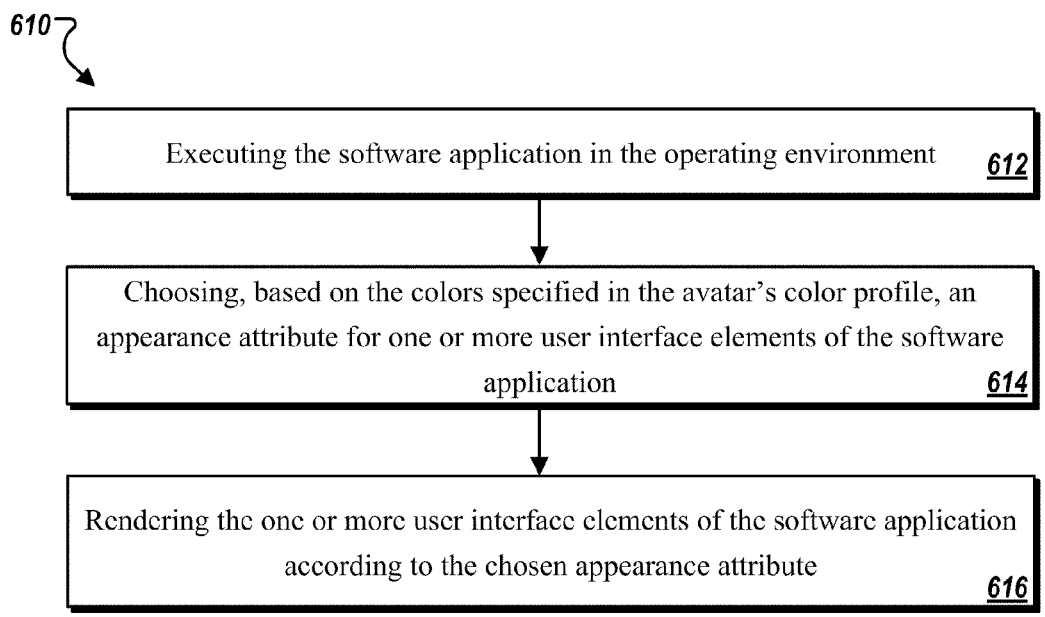
FIG. 6B is a flow diagram of an exemplary process for user-side customization of an application environment based on the color profile of a user's avatar.

FIG. 6B is a flow diagram of an exemplary process 610 for user-side customization of the application environment based on the color profile of a user's avatar. The process 610 begins when the software application is executed in the operating environment (612). Then, an appearance attribute for one or more user interface elements of the software application can be chosen based on the colors specified in the avatar's color profile (614). And the one or more user interface elements of the software application can be rendered according to the chosen appearance attribute (616). The user-side customization can be accomplished in a similar manner as the server-side customization, except that the modifications of the resources are performed on the user's device locally.

FIG. 7A is a flow diagram of an exemplary process 700 for customizing an application selection environment (e.g., a game selection interface shown in FIG. 3). The process 700 starts when an application selection interface is presented in an operating environment associated with the user (702). The application selection interface presents a respective user interface element for each application available for selection, and the application selection interface is rendered in a color scheme selected based on the color profile of the user's avatar. In some implementations, the user interface element for each application is rendered in a color scheme selected based on the color profile of the user's avatar. In some implementations, the application selection interface and the user interface elements for the available applications are rendered in different shades of a same color in the avatar's color profile.

FIG. 7B is a flow diagram of an exemplary process 710 for customizing an application selection environment based on both the color profile of the user's avatar and individual application's characteristic colors. In some implementations, one or more characteristic colors are derived from a respective program icon of each available application (712). Then, the user interface element for each available application can be rendered according to a color scheme based on the characteristic colors derived from the available application's program icon. In some implementations, the user interface elements for each available application are rendered according to a color scheme based on the characteristic colors derived from the program's icon and the color profile of the user's avatar (714).

Exemplary Software Architecture

Figure 8A:
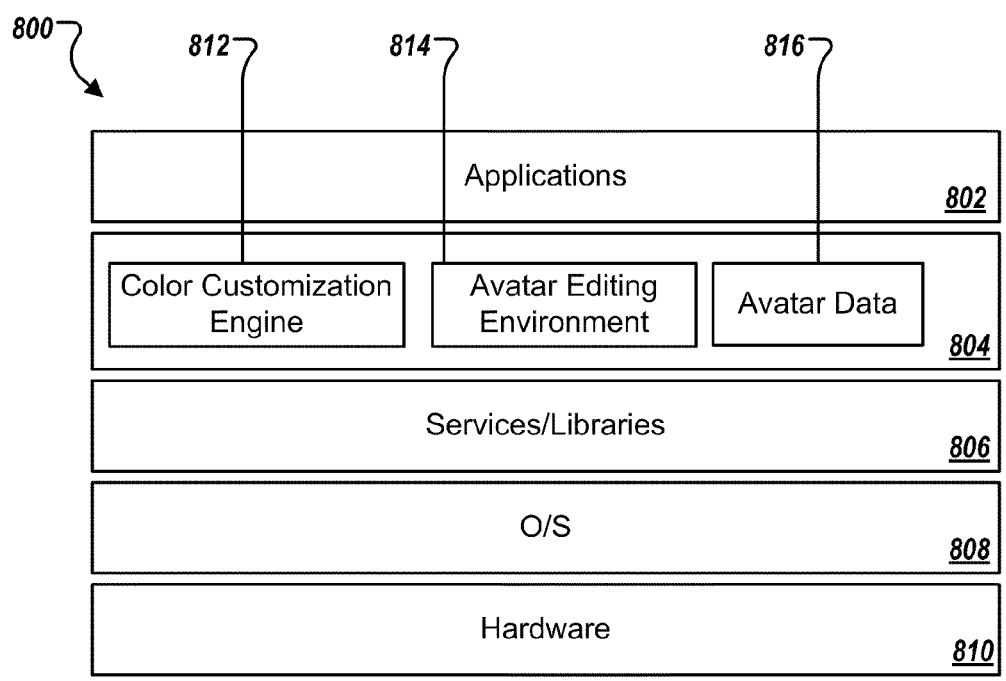
FIGS. 8A-8C are an exemplary software architecture for implementing the avatar editing environment and color customization processes described in reference to FIGS. 1-7.

FIG. 8 is an exemplary software architecture for implementing the avatar editing environment and color scheme customization described in reference to FIGS. 1-7. In some implementations, the avatar editing environment can be part of a framework in a software architecture or stack. An exemplary software stack 800 can include an applications layer 802, framework layer 804, services layer 806, OS layer 808 and hardware layer 810. Applications (e.g., email, text messaging, and games) can incorporate the avatar editing environment using an API. Framework layer 804 can include color scheme customization engine 812 and avatar editing environment 814. The Framework layer 804 also includes avatar data 816. The color scheme customization engine 812 can make API calls to graphics services or libraries in services layer 806 or OS layer 808 to perform all or some of its tasks described in reference to FIGS. 1-7. Avatar editing environment 814 can provide the user interfaces and features described in reference to FIGS. 1-2. Avatar editing environment 814 can make API calls to services or libraries in services layer 806 or OS layer 808 to perform all or some of its tasks.

Services layer 806 can provide various graphics, animations and UI services to support color customization engine 812, avatar editing environment 814 and applications (e.g., games) in applications layer 802. In some implementations, services layer 806 includes touch model for interpreting and mapping raw touch data from a touch sensitive device to touch events (e.g., gestures, rotations), which can be accessed by applications and by avatar editing environment 814 using call conventions defined in a touch model API. Services layer 806 can also include communications software stacks for wireless communications.

OS layer 808 can be a complete operating system (e.g., MAC OS) or a kernel (e.g., UNIX kernel). Hardware layer 810 includes hardware necessary to perform the tasks described in reference to FIGS. 1-7, including but not limited to: processors or processing cores (including application and communication baseband processors), dedicated signal/image processors, ASICs, graphics processors (e.g., GNUs), memory and storage devices, communication ports and devices, peripherals, etc.

Software stack 800 can be included on a mobile device capable of executing software applications. An API specification describing call conventions for accessing API functions can be used by application developers to incorporate avatar editing and color customization permissions in applications.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments, the application or client program may incorporate calls to functions or methods provided by the SDK and provided by the API, or use data types or objects defined in the SDK and provided by the API. An Application Framework may, in these embodiments, provides a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 8B:
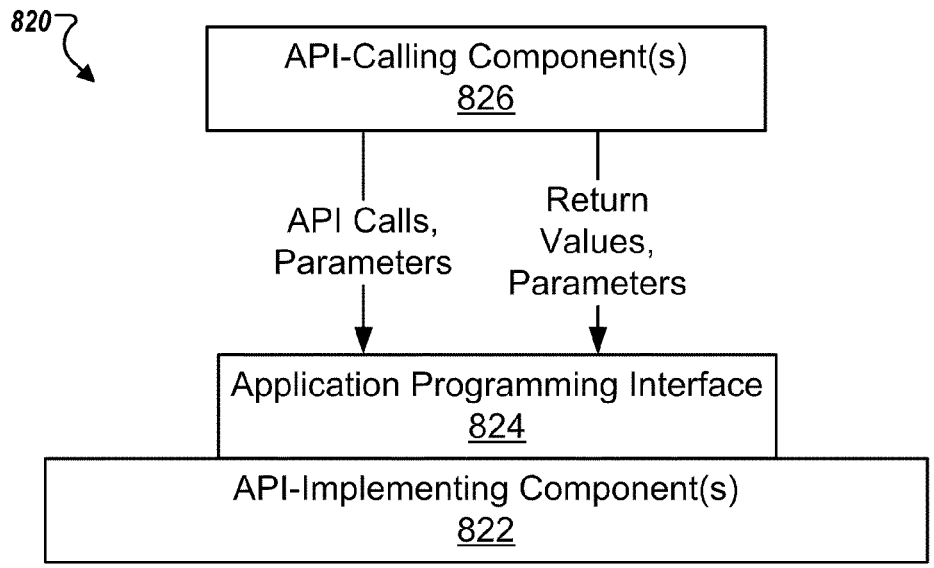

FIG. 8B is a block diagram illustrating an exemplary API architecture, which may be used in some embodiments of the invention. As shown in FIG. 8B, the API architecture 820 includes the API-implementing component 822 (e.g., an operating system, a library, a device driver, an API, an application program, software or other module) that implements the API 824. The API 824 specifies one or more functions, methods, classes, objects, protocols, data structures, formats and/or other features of the API-implementing component that may be used by the API-calling component 826. The API 824 can specify at least one calling convention that specifies how a function in the API-implementing component receives parameters from the API-calling component and how the function returns a result to the API-calling component. The API-calling component 826 (e.g., an operating system, a library, a device driver, an API, an application program, software or other module), makes API calls through the API 824 to access and use the features of the API-implementing component 822 that are specified by the API 824. The API-implementing component 822 may return a value through the API 824 to the API-calling component 826 in response to an API call.

It will be appreciated that the API-implementing component 822 may include additional functions, methods, classes, data structures, and/or other features that are not specified through the API 824 and are not available to the API-calling component 826. It should be understood that the API-calling component 826 may be on the same system as the API-implementing component 822 or may be located remotely and accesses the API-implementing component 822 using the API 824 over a network. While FIG. 8B illustrates a single API-calling component 826 interacting with the API 824, it should be understood that other API-calling components, which may be written in different languages (or the same language) than the API-calling component 826, may use the API 824.

The API-implementing component 822, the API 824, and the API-calling component 826 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 8C:
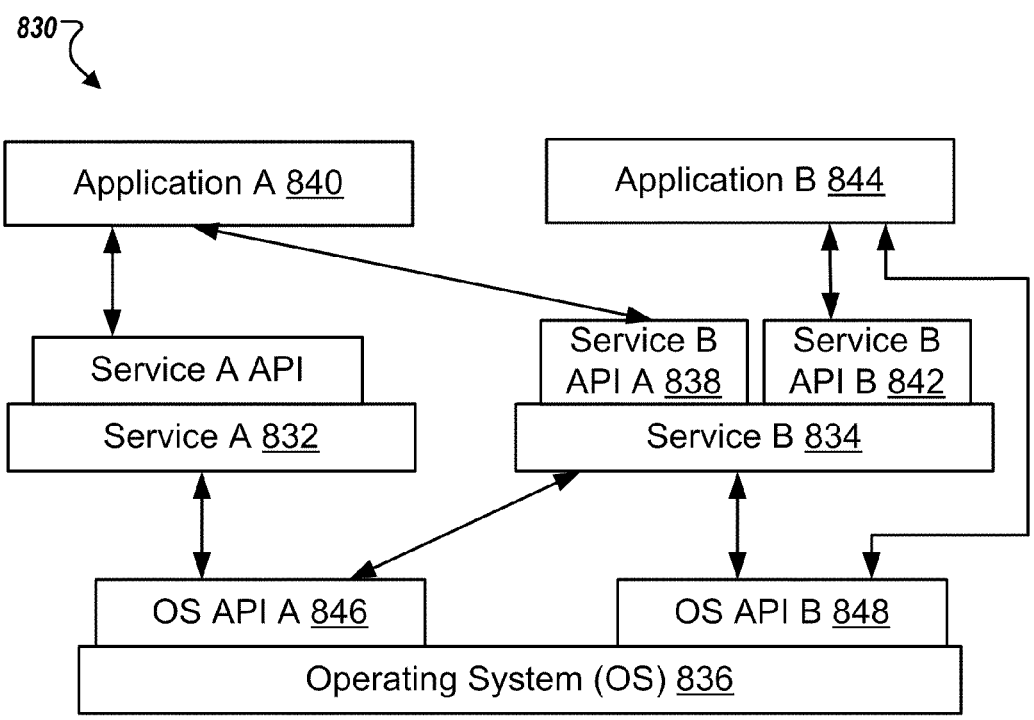

In FIG. 8C ("Software Stack" 830), an exemplary embodiment, applications can make calls to Service A 832 or Service B 834 using several Service APIs (Service API A and Service API B) and to Operating System (OS) 836 using several OS APIs. Service A 832 and service B 834 can make calls to OS 836 using several OS APIs.

Note that the Service B 834 has two APIs, one of which (Service B API A 838) receives calls from and returns values to Application A 840 and the other (Service B API B 842) receives calls from and returns values to Application B 844. Service A 832 (which can be, for example, a software library) makes calls to and receives returned values from OS API A 846, and Service B 834 (which can be, for example, a software library) makes calls to and receives returned values from both OS API A 846 and OS API B 848. Application B 844 makes calls to and receives returned values from OS API B 848.

Exemplary Mobile Device Architecture

Figure 9:
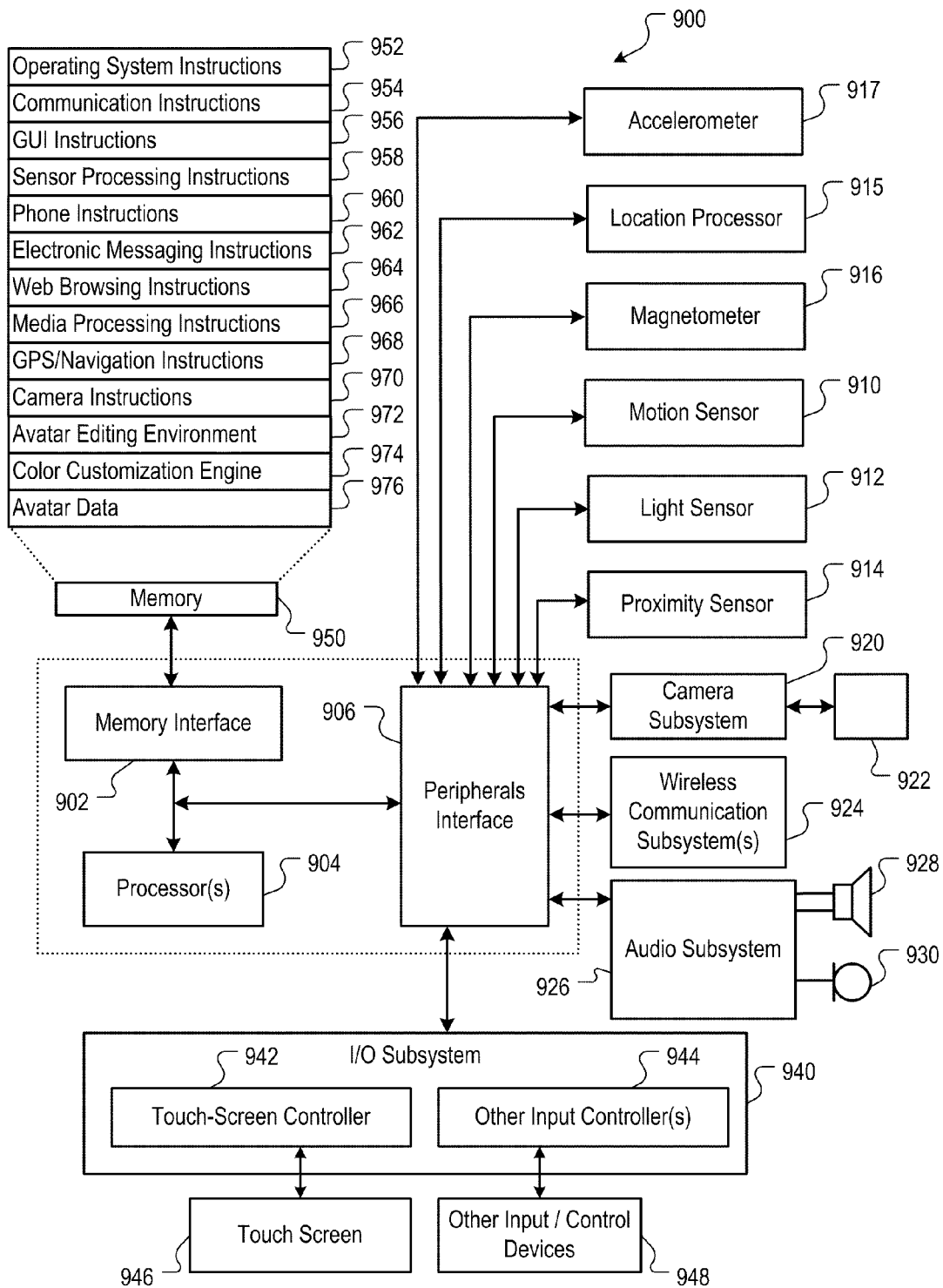
FIG. 9 is a block diagram of an exemplary hardware architecture for implementing the avatar editing environment and color customization processes described in reference to FIGS. 1-8.

FIG. 9 is a block diagram of an exemplary hardware architecture 900 for a device implementing the avatar editing environment and color scheme customization described in reference to FIGS. 1-8. The device can include memory interface 902, one or more data processors, image processors and/or processors 904, and peripherals interface 906. Memory interface 902, one or more processors 904 and/or peripherals interface 906 can be separate components or can be integrated in one or more integrated circuits. The various components in the device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to the device on or off. The user may be able to customize a functionality of one or more of the buttons. The touch screen 946 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; and camera instructions 970 to facilitate camera-related processes and functions. The memory 950 may also store other software instructions (not shown), such as security instructions, web video instructions to facilitate web video-related processes and functions, and/or web-shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950.

Memory 950 can include instructions for avatar editing environment 972 and avatar animation engine 974. Memory 950 can be a local cache for avatar data 976 that results from the avatar editing process.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
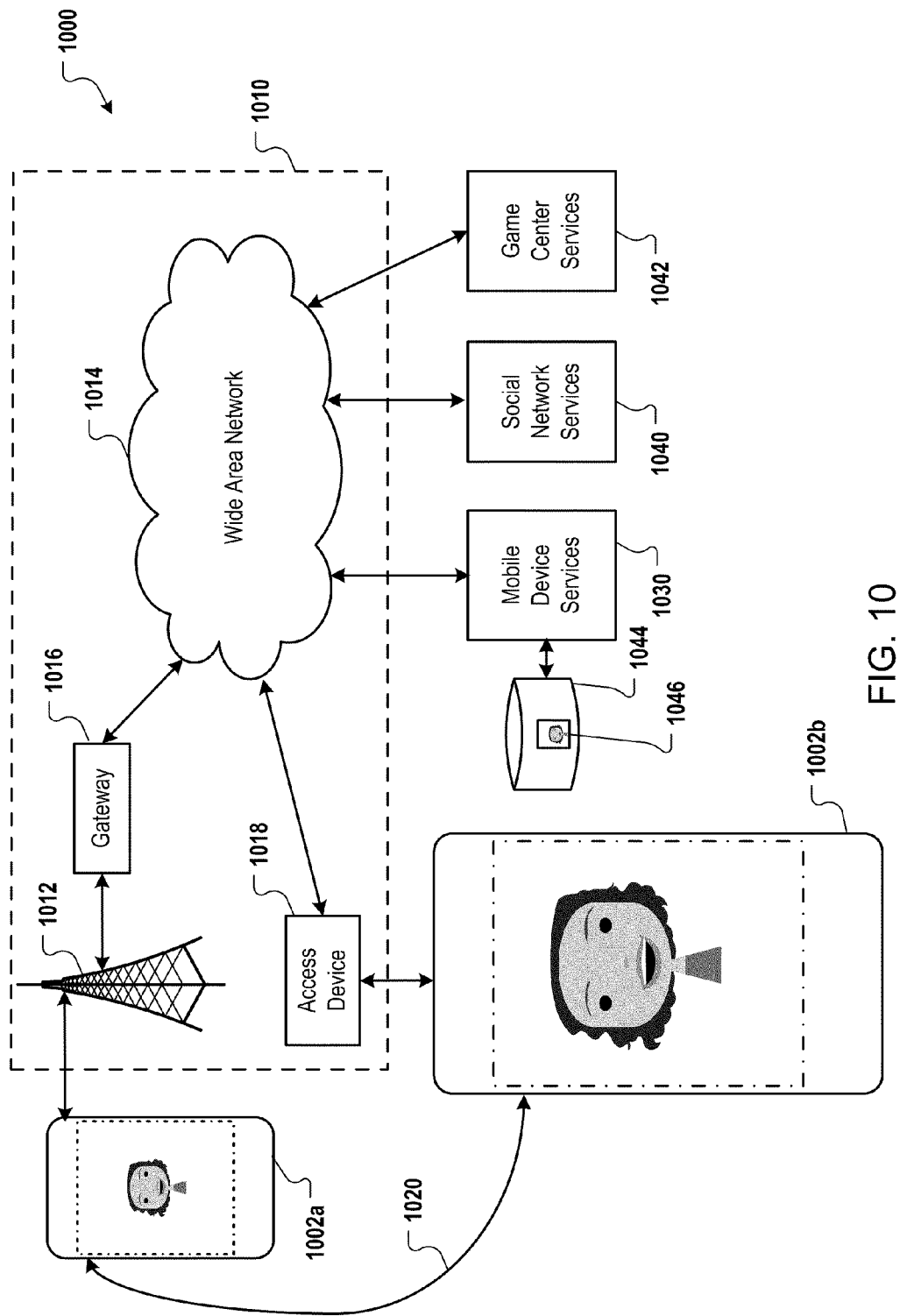
FIG. 10 is a block diagram of an exemplary network operating environment for a device employing the avatar editing environment and color customization processes described in reference to FIGS. 1-9.

FIG. 10 is a block diagram of an exemplary network operating environment 1000 for a device employing the avatar editing environment and animation described in reference to FIGS. 1-8. In this example, devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014. Although this example illustrates an operating environment for mobile devices, the operating environment can also be applied to a device that is wired to a network (e.g., a desktop computer).

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, device 1002a or 1002b can be physically connected to the access device 1018 using one or more cables and the access device 1018 can be a personal computer. In this configuration, device 1002a or 1002b can be referred to as a "tethered" device.

Devices 1002a and 1002b can also establish communications by other means. For example, wireless device 1002a can communicate with other wireless devices, e.g., other devices 1002a or 1002b, cell phones, etc., over the wireless network 1012. Likewise, devices 1002a and 1002b can establish peer-to-peer communications 1020, e.g., a personal area network, by use of one or more communication subsystems, such as the Bluetooth™ communication devices. Other communication protocols and topologies can also be implemented.

Device 1002a or 1002b can communicate with a variety of services over the one or more wired and/or wireless networks. In some implementations, services can include mobile device services 1030, social network services 1040, and game center services 1042.

Mobile device services 1030 can provide a variety of services for device 1002a or 1002b, including but not limited to mail services, text messaging, chat sessions, videoconferencing, Internet services, location based services (e.g., map services), sync services, remote storage 1044, downloading services, etc. Remote storage 1046 can be used to store avatar data, which can be used on multiple devices of the user or shared by multiple users. In some implementations, an avatar editing environment can be provided by one or more of the services 1030, 1040, 1042, which can be accessed by a user of device 1002a or 1002b through, for example, web pages served by one or more servers operated by the services 1030, 1040, 1042.

In some implementations, social networking services 1040 can provide a social networking website, where a user of device 1002a or 1002b can set up a personal network and invite friends to contribute and share content, including avatars and avatar related items. A user can use their custom avatar made with an avatar editing environment in place of a digital photo to protect their privacy.

In some implementations, game center services 1042 can provide an online gaming environment, where users of device 1002a or 1002b can participate in online interactive games with their avatars created using the avatar editing environment described in reference to FIGS. 1-7. In some implementations, the online gaming environment can be customized according to the color profiles of the participating gamers' avatars. In some implementations, the online gaming environment can be rendered differently on each gamer's device to reflect the individual gamer's color preferences. In some implementations, avatars and/or elements created by an avatar editing environment can be shared among users or sold to players of online games. For example, an avatar store can be provided by game center services 1042 for users to buy or exchange avatars and avatar related items (e.g., clothes, accessories).

Device 1002a or 1002b can also access other data and content over the one or more wired and/or wireless networks. For example, content publishers, such as news sites, Rally Simple Syndication (RSS) feeds, web sites, blogs, social networking sites, developer networks, etc., can be accessed by device 1002a or 1002b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more processors, comprising:
   executing a software application associated with a color scheme, wherein one or more user interface elements displayed by executing the software application include default colors defined by the color scheme;
   obtaining, from an avatar editing environment, a color profile of an avatar associated with a user, the avatar developed in the avatar editing environment, the avatar being a representation of the user within the software application, the color profile specifying one or more colors associated with one or more constituent elements of the avatar; and
   customizing the color scheme associated with the software application by modifying a default color of a user interface element displayed by executing the software application based on the color profile of the user's avatar, the user interface element different from the avatar, wherein modifying the default color of the user interface element based on the color profile of the user's avatar comprises rendering the user interface element in a combination of the default color and a color in the avatar.

2. The method of claim 1, wherein customizing the color scheme associated with the software application based on the color profile of the user's avatar further comprises:
   choosing, based on the colors specified in the avatar's color profile, an appearance attribute for one or more user interface elements of the software application;
   modifying resources associated with the user interface elements according to the chosen appearance attribute; and
   providing the software application with the modified resources for download to a device associated with the user.

3. The method of claim 1, wherein customizing the color scheme associated with the software application based on the color profile of the user's avatar further comprises:
   executing the software application in an operating environment;

choosing, based on the colors specified in the avatar's color profile, an appearance attribute for one or more user interface elements of the software application; and rendering the one or more user interface elements of the software application according to the chosen appearance attribute.

4. The method of claim 1, further comprising:
providing the avatar editing environment associated with the user;
receiving user input through the avatar editing environment, the user input specifying the one or more colors associated with the one or more constituent elements of the avatar; and
creating the color profile of the avatar based on the one or more colors associated with the one or more constituent elements of the avatar.

5. The method of claim 4, where receiving user input through the avatar editing environment further comprises:
receiving first user input selecting one of the one or more constituent element of the avatar;
receiving second user input invoking a color picker in the avatar editing environment, the color picker showing a plurality of suggested colors;
receiving third user input selecting one of the plurality of suggested colors from the color picker; and
associating the selected color with the selected constituent element of the avatar.

6. The method of claim 5, wherein the color picker presents a plurality of discrete colors for selection.

7. The method of claim 5, wherein the color picker presents a gradient of colors for selection.

8. The method of claim 5, wherein the color picker presents the selected constituent element in a plurality of suggested colors.

9. The method of claim 8, wherein the plurality of suggested colors is provided based on the selected constituent element.

10. The method of claim 5, wherein the color picker presents a color gradient in a first dimension, and an intensity gradient in a second dimension.

11. The method of claim 5, wherein the color picker presents a coarse color selection portion and a fine color selection portion, the coarse color selection portion presenting a plurality of discrete colors for selection, and the fine color selection portion presenting different shades of a currently selected color indicated in the coarse color selection portion.

12. The method of claim 5, wherein the color picker presents a zoomed image of the selected element and allows independent color selection for each of multiple portions of the selected element.

13. The method of claim 1, further comprising:
presenting an application selection interface by executing the software, the application selection interface presenting a respective user interface element for each application available for selection, and the application selection interface being rendered in a first color scheme selected based on the color profile of the user's avatar.

14. The method of claim 13, wherein the user interface element for each application is rendered in a second color scheme selected based on the color profile of the user's avatar.

15. The method of claim 14, wherein the application selection interface and the user interface elements for the available applications are rendered in different shades of a same color in the avatar's color profile.

16. The method of claim 13, further comprising:
deriving one or more characteristic colors from a respective program icon of each available application; and
rendering the user interface element for each available application according to a third color scheme based on the characteristic colors derived from the available application's program icon.

17. The method of claim 16, further comprising:
rendering the user interface element for each available application according to a fourth color scheme based on the characteristic colors derived from the program's icon and the color profile of the user's avatar.

18. The method of claim 1, further comprising:
providing avatar data to the software application, the avatar data operable for creating the avatar in an application environment of the software application; and
creating a customized avatar based on the avatar data to replace a default avatar in the application environment.

19. A computer implemented method performed by one or more processors, comprising:
providing an avatar editing environment associated with a user;
receiving user input through the avatar editing environment, the user input specifying one or more colors associated with one or more constituent elements of the avatar;
creating a color profile of the avatar based on the one or more colors associated with the one or more constituent elements of the avatar;
executing a software application associated with a color scheme, wherein one or more user interface elements displayed by executing the software application include default colors defined by the color scheme;
obtaining, from the avatar editing environment, a color profile of the avatar which is a representation of the user within the software application; and
customizing a first color scheme associated with the software application by modifying a default color of a user interface element displayed by executing the software application based on the color profile of the user's avatar, the user interface element different from the avatar, wherein modifying the default color of the user interface element based on the color profile of the user's avatar comprises rendering the user interface element in a combination of the default color and a color in the avatar.

20. The method of claim 19, further comprising:
presenting an application selection interface by executing the software application, the application selection interface presenting a respective user interface element for each application available for selection, and the application selection interface being rendered in a second color scheme selected based on the color profile of the user's avatar.

21. The method of claim 20, further comprising:
choosing, based on the colors specified in the avatar's color profile, an appearance attribute for one or more user interface elements of the software application; and
rendering the one or more user interface elements of the software application according to the chosen appearance attribute.

22. A system for creating a customized color scheme for a software application environment, comprising:
one or more processors;
a computer-readable medium coupled to the one or more processors and storing instructions, which, when executed by the one or more processors, causes the one or more processors to perform operations, comprising:

providing an avatar editing environment associated with a user;

receiving user input through the avatar editing environment, the user input specifying a plurality of colors associated with a respective plurality of constituent elements of the avatar;

creating a color profile of the avatar based on the plurality of colors associated with the respective plurality of constituent elements of the avatar;

executing a software application associated with a color scheme, wherein one or more user interface elements displayed by executing the software application include default colors defined by the color scheme; and customizing a color scheme associated with the software application by modifying a default color of a user interface element displayed by executing the software application based on the color profile of the user's avatar, the user interface element different from the avatar, wherein modifying the default color of the user interface element based on the color profile of the user's avatar comprises rendering the user interface element in a combination of the default color and a color in the avatar.

23. A non-transitory computer-readable medium coupled to the one or more processors and storing instructions, which, when executed by the one or more processors, causes the one or more processors to perform operations, comprising:

executing a software application associated with a color scheme, wherein one or more user interface elements displayed by executing the software application include default colors defined by the color scheme;

obtaining, from an avatar editing environment, a color profile of an avatar associated with a user, the avatar developed in the avatar editing environment, the avatar being a representation of the user within the software application, the color profile specifying a plurality of colors associated with a respective plurality of constituent elements of the avatar; and customizing the color scheme associated with the software application by modifying a default color of a user interface element displayed by executing the software application based on the color profile of the user's avatar, the user interface element different from the avatar, wherein modifying the default color of the user interface element based on the color profile of the user's avatar comprises rendering the user interface element in a combination of the default color and a color in the avatar.

24. The method of claim 1, further comprising modifying a plurality of default colors of a plurality of user interface elements displayed by executing the software application, each user interface element being different from the avatar.

25. The method of claim 24, wherein modifying the plurality of default colors of the plurality of user interface elements comprises rendering the plurality of user interface elements in different shades of a combination of a default color of each user interface element and a color in the avatar.

26. The method of claim 19, further comprising modifying a plurality of default colors of a plurality of user interface elements displayed by executing the software application, each user interface element being different from the avatar.

27. The method of claim 26, wherein modifying the plurality of default colors of the plurality of user interface elements comprises rendering the plurality of user interface elements in different shades of a combination of a default color of each user interface element and a color in the avatar.

28. The system of claim 22, wherein the operations further comprise modifying a plurality of default colors of a plurality of user interface elements displayed by executing the software application, each user interface element being different from the avatar.

29. The system of claim 28, wherein modifying the plurality of default colors of the plurality of user interface elements comprises rendering the plurality of user interface elements in different shades of a combination of a default color of each user interface element and a color in the avatar.

30. The system of claim 23, wherein the operations further comprise modifying a plurality of default colors of a plurality of user interface elements displayed by executing the software application, each user interface element being different from the avatar.

31. The system of claim 30, wherein modifying the plurality of default colors of the plurality of user interface elements comprises rendering the plurality of user interface elements in different shades of a combination of a default color of each user interface element and a color in the avatar.

* * * * *